United States Patent
Nie et al.

(10) Patent No.: US 11,242,483 B2
(45) Date of Patent: Feb. 8, 2022

(54) QUANTUM DOT

(71) Applicant: TCL TECHNOLOGY GROUP CORPORATION, Huizhou (CN)

(72) Inventors: Zhiwen Nie, Huizhou (CN); Yixing Yang, Huizhou (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 0 days.

(21) Appl. No.: 17/043,628

(22) PCT Filed: Aug. 30, 2019

(86) PCT No.: PCT/CN2019/103817
§ 371 (c)(1),
(2) Date: Sep. 29, 2020

(87) PCT Pub. No.: WO2020/063258
PCT Pub. Date: Apr. 20, 2020

(65) Prior Publication Data
US 2021/0017446 A1 Jan. 21, 2021

(30) Foreign Application Priority Data

Sep. 30, 2018 (CN) .......... 201811156535.2
Sep. 30, 2018 (CN) .......... 201811156539.0
Sep. 30, 2018 (CN) .......... 201811156612.4
Sep. 30, 2018 (CN) .......... 201811157455.9
Sep. 30, 2018 (CN) .......... 201811157466.7

(51) Int. Cl.
| | | |
|---|---|---|
| *C09K 11/02* | (2006.01) | |
| *C09K 11/08* | (2006.01) | |
| *C09K 11/70* | (2006.01) | |
| *C09K 11/88* | (2006.01) | |
| *C09K 11/54* | (2006.01) | |
| *C09K 11/56* | (2006.01) | |
| *C09K 11/62* | (2006.01) | |
| *C09K 11/74* | (2006.01) | |
| *B82Y 20/00* | (2011.01) | |
| *B82Y 40/00* | (2011.01) | |
| *B82Y 30/00* | (2011.01) | |

(52) U.S. Cl.
CPC ............ *C09K 11/025* (2013.01); *C09K 11/02* (2013.01); *C09K 11/0883* (2013.01); *C09K 11/54* (2013.01); *C09K 11/56* (2013.01); *C09K 11/62* (2013.01); *C09K 11/70* (2013.01); *C09K 11/703* (2013.01); *C09K 11/7492* (2013.01); *C09K 11/88* (2013.01); *C09K 11/883* (2013.01); *B82Y 20/00* (2013.01); *B82Y 30/00* (2013.01); *B82Y 40/00* (2013.01)

(58) Field of Classification Search
CPC . C09K 11/025; C09K 11/883; C09K 11/0883; C09K 11/74; C09K 11/92
See application file for complete search history.

(56) References Cited

U.S. PATENT DOCUMENTS

| | | | |
|---|---|---|---|
| 9,517,936 B2 * | 12/2016 | Jeong | C01B 21/06 |
| 10,050,161 B2 * | 8/2018 | Ono | H01L 21/02546 |
| 2017/0037314 A1 | 2/2017 | Nam et al. | |
| 2018/0016495 A1 * | 1/2018 | Kim | C09K 11/7492 |

FOREIGN PATENT DOCUMENTS

| | | | |
|---|---|---|---|
| CN | 102199425 A | | 9/2011 |
| CN | 106566529 | * | 4/2017 |
| CN | 106957652 A | | 7/2017 |
| CN | 107338048 A | | 11/2017 |
| CN | 108239535 A | | 7/2018 |
| CN | 109929552 A | | 6/2019 |
| WO | 2017115920 A1 | | 7/2017 |
| WO | 2018108765 A1 | | 6/2018 |
| WO | 2018108767 A1 | | 6/2018 |

OTHER PUBLICATIONS

Translation for CN 106566529, Apr. 19, 2017.*
World Intellectual Property Organization (WIPO) International Search Report for PCT/CN2019/103817 dated Dec. 9, 2019 5 Pages.

* cited by examiner

*Primary Examiner* — C Melissa Koslow
(74) *Attorney, Agent, or Firm* — Anova Law Group, PLLC

(57) ABSTRACT

The present disclosure provides a quantum dot. The quantum dot includes a group III-V quantum dot core, and at least one type of halide ions, acetylacetonate ions, or hydroxyl ions bound to a surface of the group III-V quantum dot core, where the halide ions, the acetylacetonate ions and the hydroxyl ions are bound with group III cations on the surface of the group III-V quantum dot core.

19 Claims, 1 Drawing Sheet

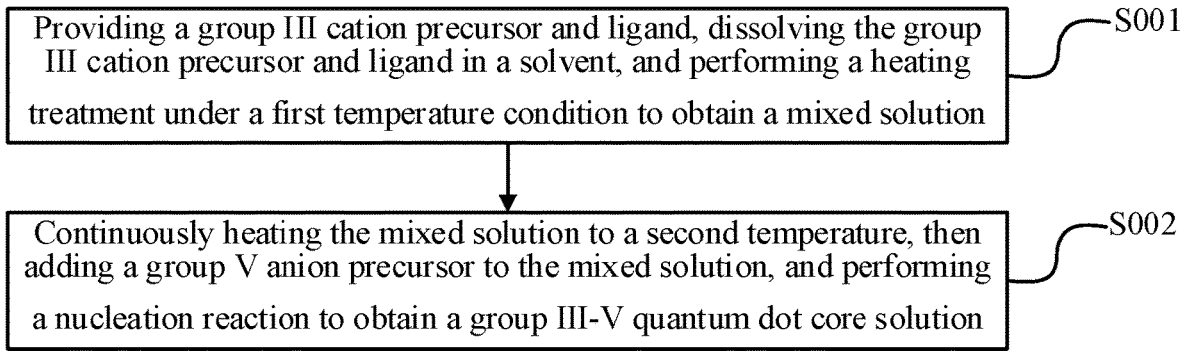

QUANTUM DOT

CROSS-REFERENCES TO RELATED APPLICATIONS

This application is a national phase entry of PCT Patent Application No. PCT/CN2019/103817, filed on Aug. 30, 2019, which claims the priority of Chinese Patent Application No. 201811156612.4, entitled "QUANTUM DOT AND FABRICATION METHOD THEREOF", Chinese Patent Application No. 201811156539.0, entitled "QUANTUM DOT AND FABRICATION METHOD THEREOF", Chinese Patent Application No. 201811156535.2, entitled "QUANTUM DOT AND FABRICATION METHOD THEREOF", Chinese Patent Application No. 201811157455.9, entitled "QUANTUM DOT AND FABRICATION METHOD THEREOF", and Chinese Patent Application No. 201811157466.7, entitled "QUANTUM DOT AND FABRICATION METHOD THEREOF", all are filed on Sep. 30, 2018, the entirety of all of which is incorporated herein by reference.

FIELD OF THE DISCLOSURE

The present disclosure generally relates to the field of nanomaterial technology and, more particularly, relates to a quantum dot.

BACKGROUND

A quantum dot, also known as a semiconductor nanocrystal, has a particle radius close to or smaller than an exciton Bohr radius. Due to the existence of "quantum size" effect, as the size of quantum dot further decreases, a continuous energy-level structure will gradually change to a discrete, discontinuous energy-level structure. After being excited by light with a certain wavelength, electrons in a valence band absorb photons with a certain energy and are excited to a conduction band, while electrons in an excited state will transition from the conduction band to the valence band, and release energy in the form of light, thus significant fluorescence phenomenon occurs. Therefore, by adjusting the size and chemical composition of the quantum dot through a certain way, the emission spectrum thereof is capable of covering the entire visible light region, and even the near-infrared region. The high-quality quantum dot is often made by a solution method. On the one hand, quantum dot as a colloidal solution has high dispersion, which facilitates physical operation. On the other hand, quantum dot is featured with advantages of high color purity, wide color gamut, and high stability, and is a core material of a new-generation display technology.

So far, the synthesis and preparation of group II-VI quantum dot have become increasingly mature. The prepared quantum dot is not only of high quality, but also has desired fluorescent performance. At the same time, the quantum dots used in high-performance device, especially red and green quantum dots, are mostly formed based on group II-VI compounds, which not only have high luminous efficiency, but also have long fluorescence life, all meet the demands of commercial applications. However, because the Group II-VI quantum dot itself contains restricted heavy metal element, the group II-VI quantum dot is strictly restricted in practical applications and development. On the contrary, with respect to the group II-VI quantum dot, group III-V typified by InP quantum dot has many incomparably superior performances. On the one hand, the InP quantum dot has a Bohr radius of 13 nm, and the large Bohr radius makes the subjected quantum dot effect substantially strong. On the other hand, the InP quantum dot does not contain the restricted heavy metal element, which is in line with the concept of green environmental protection and does not have inherent toxicity, is regarded as the most important core material for replacing the conventional highly toxic and heavily polluted Group II-VI cadmium-based quantum dot, and at the same time, is also the key for breaking through the existing display technology.

The InP quantum dot has some shortcomings. First, compared with the conventional type group II-VI quantum dot formed by bonding with an ionic bond, In and P elements are bound with a covalent bond to form the InP quantum dot, and, thus, the stability of the prepared quantum dot is usually poor. Second, the surface of InP quantum dot contains a large number of P dangling bonds, and the existence of dangling bonds as non-radiative recombination transition centers will greatly reduce the luminous efficiency thereof, and, thus, the luminous efficiency of an InP core is usually less than 1%. To further prepare a quantum dot with high luminous efficiency, one or more layers of outer-shell material with a wide-bandgap need to be coated on an outer surface of the InP core. Such a core-shell structure is capable of effectively separating the carriers confined in the core and the surface states acting as the non-radiative recombination transition centers, thereby greatly improving the luminous efficiency of the InP core. At present, the commonly used outer-shell material is selected as ZnSe or ZnS. Due to the large lattice mismatch between InP and ZnSe or ZnS, it is difficult to effectively grow ZnSe or ZnS outer-shell on the InP surface, such that the ultimate quantum dot with a core-shell structure has a substantially low luminous efficiency. Generally, a thickness of the outer-shell of the quantum dot with a substantially high synthetic quality is equal to or smaller than 2 nm, and the stability is poor. On the one hand, because the thin outer-shell does not facilitate the perfect binding of excitons, the electron or hole wave functions are easily delocalized into the outer-shell, which greatly limits the application of InP quantum dot in the new display. On the other hand, due to the limited selection of P source and strong activity thereof, a large amount of P monomer is used for nucleation at the moment of high-temperature injection, and P monomer for subsequent growth of the outer-shell after nucleation is not enough. Therefore, the nucleated particle further grows through Ostwald ripening, and the ultimate quantum dots have a substantially poor size distribution and a substantially wide peak width.

At present, the preparation method based on the InP quantum dot often adopts a two-pot method. In other words, the InP core is first prepared, and then the precursors required for the transition shell or the outer-shell are added to the cleaned core solution. The heating rate in such method needs to be precisely controlled, and both the nucleation and shell-growth process need a long reaction time-period. Further, the out-shell precursor easily spontaneously nucleates during the addition process, which does not facilitate subsequent out-shell growth.

Therefore, the related technology needs to be improved.

BRIEF SUMMARY OF THE DISCLOSURE

Technical Problem

One of the objectives of the embodiments of the present disclosure is to provide a type of quantum dots, which aims to solve the technical problems of low luminous efficiency of existing Group III-V quantum dot.

Technical Solution

To solve the above technical problems, the disclosed embodiments of the present disclosure provide technical solutions including the following.

One aspect of the present disclosure provides a quantum dot. The quantum dot includes a group III-V quantum dot core, and at least one type of halide ions, acetylacetonate ions, or hydroxyl ions bound to a surface of the group III-V quantum dot core, where the halide ions, the acetylacetonate ions and the hydroxyl ions are bound with group III cations on the surface of the group III-V quantum dot core.

Another aspect of the present disclosure provides a quantum dot. The quantum dot includes a group III-V quantum dot core, group II cations bound with group V anions on a surface of the group III-V quantum dot core, and at least one type of halide ions, acetylacetonate ions, or hydroxyl ions bound with group III cations and the group II cations on the surface of the group III-V quantum dot core.

BRIEF DESCRIPTION OF THE DRAWINGS

To more clearly illustrate the technical solutions in the disclosed embodiments of the present disclosure, drawings to be used in the description of the embodiments will be briefly described below. It is obvious that the drawings in the following description are certain embodiments of the present disclosure, and other drawings may be obtained by a person of ordinary skill in the art in view of the drawings provided without creative efforts.

FIG. 1 illustrates a schematic flow chart of a fabrication method of a quantum dot consistent with an embodiment of the present disclosure.

DETAILED DESCRIPTION

For clearer understanding of the aims, technical solutions and effects of the present disclosure, the present disclosure is further described in detail with reference to the accompanying drawings and embodiments. It should be understood that the specific embodiments described herein are only used to explain the present disclosure, and are not used to limit the present disclosure.

It should be noted that the terms "including" and "containing" may indicate the existence of the described feature, entirety, element and/or component, but may not exclude the existence or addition of one or more of other features, entireties, elements, components and/or a collection thereof. In addition, the terms "first" and "second" may be merely used for description purposes, and may not be understood as indicating or implying relative importance or implicitly indicating the quantity of indicated technical features. Thus, the features defined as "first" and "second" may explicitly or implicitly include one or more features.

Some embodiments of the present disclosure provide a fabrication method of a quantum dot. Referring to FIG. 1, the fabrication method may include following steps.

S001: Providing a group III cation precursor and ligand, dissolving the group III cation precursor and ligand in a solvent, and performing a heating treatment under a first temperature condition to obtain a mixed solution.

S002: Continuously heating the mixed solution to a second temperature, then adding a group V anion precursor to the mixed solution, and performing a nucleation reaction to obtain a group III-V quantum dot core solution.

In the fabrication method of the quantum dot provided by the disclosed embodiments of the present disclosure, before performing the nucleation reaction, the group III cation precursor and ligand may be first dissolved in the solvent and heated under the first temperature condition, which may not only enable the ligands to be fully coordinated with the group III cations and facilitate the full reaction of anions and cations, but also effectively remove water and oxygen in the reaction system in advance, so as to avoid the easily oxidized defects on the surface of the formed group III-V quantum dot core, such that the luminous effect of the ultimately formed quantum dot may be improved. At the same time, the process of heating from the first temperature to the second temperature for performing the nucleation reaction may be a continuous heating process, which may greatly shorten the nucleation time, and the high temperature nucleation may facilitate improving the crystallinity of the quantum dot and may increase the yield of the quantum dots. Therefore, such fabrication method of the quantum dot with stable technology, simple process and low cost may greatly facilitate the late-stage large-scale fabrication.

In one embodiment, in the above step S001, the group III cation precursor may be selected from at least one of indium chloride, indium bromide, indium iodide, indium acetate, indium carbonate, indium nitrate, indium perchlorate, indium cyanide, gallium chloride, gallium bromide, gallium iodide, gallium carbonate, gallium nitrate, gallium perchlorate, gallium cyanide, aluminum chloride, aluminum bromide, aluminum iodide, aluminum carbonate, aluminum nitrate, aluminum perchlorate, aluminum cyanide, indium acetylacetonate, gallium acetate, gallium acetylacetonate, aluminum acetate, aluminum acetylacetonate, aluminum isopropoxide, indium hexafluoroacetylacetonate, gallium hexafluoroacetylacetonate, aluminum isopropoxide, aluminum hexafluoroacetylacetonate, indium oxide, indium hydroxide, gallium oxide, gallium hydroxide, aluminum oxide, and aluminum hydroxide. The ligand may be selected from at least one of oleic acid, C4-C20 saturated fatty acids (e.g., saturated fatty acids with 4-20 carbon atoms), phosphines substituted with C6-C22 alkyl (e.g., organic phosphines having a substituent with 6-22 carbon atoms, such as trioctylphosphine), phosphine oxides substituted with C6-C22 alkyl (e.g., organic phosphine oxides having a substituent with 6-22 atoms carbon, such as trioctylphosphine oxide), C4-C20 primary amines (e.g., primary amines with 4-20 carbon atoms, such as hexadecylamine), C6-C22 secondary amines (e.g., secondary amines having a substituent with 6-22 carbon atoms, such as dioctylamine), and C6-C40 tertiary amines (e.g., tertiary amines having a substituent with 6-40 carbon atoms, such as trioctylamine). The solvent may be a non-ligand solvent, and may be selected from at least one of C6-C40 aliphatic hydrocarbons (e.g., aliphatic hydrocarbons with 6-40 carbon atoms, such as alkanes, alkenes, or alkynes, specifically, hexadecane, octadecane, octadecene, or squalane), C6-C30 aromatic hydrocarbons (e.g., aromatic hydrocarbons with 6-30 carbon atoms, such as phenyldodecane, phenyltetradecane, or phenylhexadecane), nitrogen-containing heterocyclic compounds (such as pyridine), and C12-C22 aromatic ethers (e.g., aromatic ethers with 12-22 carbon atoms, such as phenyl ether or benzyl ether).

In one embodiment, the heating treatment may be performed in an inert atmosphere and under the first temperature condition. The inert atmosphere may be specifically nitrogen gas, and the inert atmosphere may isolate air to enable the reaction system to be substantially stable. In one embodiment, the first temperature may be 100-200° C. The heating time-period for the heating treatment under the first temperature condition may be 1-2 hours. Within such temperature and time-period range, the best effect of coordinating the ligands and the group III cations may be achieved, and the best effect of removing water and oxygen in the reaction system may be achieved. In one embodiment, before performing the heating treatment under the first temperature condition, the fabrication method may further include a vacuum treatment step. The vacuum treatment may enable the water and oxygen in the entire reaction system to be fully removed as much as possible before performing the nucleation reaction. Specifically, a temperature of the vacuum treatment may be 80-150° C., and a time-period of the vacuum treatment may be 30 minutes –1 hour.

In one embodiment, a first group II cation precursor and the group III cation precursor and ligand may be dissolved in a solvent, and a heating treatment may be performed under the first temperature condition. Before performing the nucleation reaction, the group II cation precursor may be first added to the reaction system. At the moment of nucleation, the group II cations may not only be effectively bound to the surface of the group III-V quantum dot core, thereby passivating the group III-V quantum dot core, and at the same time, but also serve as a precursor for subsequently growing the group II-VI semiconductor outer-shell.

Specifically, the first group II cation precursor may be selected from at least one of zinc chloride, zinc bromide, zinc iodide, zinc acetate, zinc stearate, zinc undecylenate, zinc acetylacetonate, zinc hexafluoroacetylacetonate, zinc oxide, zinc hydroxide, zinc carbonate, zinc nitrate, zinc perchlorate, zinc cyanide, cadmium chloride, cadmium bromide, cadmium iodide, cadmium acetate, cadmium stearate, cadmium undecylenate, cadmium acetylacetonate, cadmium hexafluoroacetylacetonate, cadmium oxide, cadmium hydroxide, cadmium carbonate, cadmium nitrate, cadmium perchlorate, cadmium cyanide, magnesium chloride, magnesium bromide, magnesium iodide, magnesium acetate, magnesium stearate, magnesium undecylenate, magnesium acetylacetonate, magnesium hexafluoroacetylacetonate, magnesium oxide, magnesium hydroxide, magnesium carbonate, magnesium nitrate, magnesium perchlorate, magnesium cyanide, mercury chloride, mercury bromide, mercury iodide, mercury acetate, mercury acetylacetonate, mercury oxide, mercury hydroxide, mercury carbonate, mercury nitrate, mercury perchlorate and mercury cyanide.

In one embodiment, in the above step S002, the group V anion precursor may be selected from at least one of tris(trimethylsilyl)phosphine, tris(trigermanyl) phosphine, tris(dimethylamino)phosphine, tris(diethylamino)phosphine, triethylphosphine, tributylphosphine, trioctylphosphine, triphenylphosphine, tricyclohexylphosphine, tris(trimethylsilyl) arsenate, tris(dimethylamino) arsenate, tris(diethylamino) arsenate, triethyl arsenate, tributyl arsenate, trioctyl arsenate, triphenyl arsenate, tricyclohexyl arsenate, arsenic oxide, arsenic chloride, arsenic bromide, arsenic iodide, arsenic sulfide and ammonia. In one embodiment, the second temperature may be 260-320° C., and a time-period of the nucleation reaction may be 1-20 minutes. The second temperature may be a generation temperature of the group III-V quantum dot core. Within such temperature and time-period range, the group III-V quantum dot core may be substantially well formed.

In one embodiment, immediately after completing the above nucleation reaction, a second group II cation precursor and a group VI anion precursor may be added to the group III-V quantum dot core solution. The outer-shell growth may be performed under a third temperature condition, and a group II-VI semiconductor outer-shell may be formed on the surface of the group III-V quantum dot core, to obtain a core-shell quantum dot solution. Specifically, the second group II cation precursor may be selected from at least one of cadmium oleate, cadmium butyrate, cadmium decanoate, cadmium hexanoate, cadmium octanoate, cadmium dodecanoate, cadmium myristate, cadmium palmitate, cadmium stearate, mercury oleate, mercury butyrate, mercury decanoate, mercury hexanoate, mercury octanoate, mercury dodecanoate, mercury myristate, mercury palmitate, mercury stearate, zinc oleate, zinc butyrate, zinc decanoate, zinc hexanoate, zinc octanoate, zinc dodecanoate, zinc myristate, zinc palmitate, zinc stearate, magnesium oleate, magnesium butyrate, magnesium decanoate, magnesium hexanoate, magnesium octanoate, magnesium dodecanoate, magnesium myristate, magnesium palmitate, and magnesium stearate. The group VI anion precursor may be selected from at least one of hexanethiol, octanethiol, decanethiol, dodecanethiol, hexadecanethiol, mercaptopropylsilane, trioctylphosphine sulfide, tributylphosphine sulfide, triphenylphosphine sulfide, trioctylamine sulfide, tris (trimethylsilyl) sulfide, ammonium sulfide, sodium sulfide, trioctylphosphine selenide, tributylphosphine selenide, triphenylphosphine selenide, tributylphosphine telluride, trioctylphosphonium telluride, and triphenylphosphine telluride.

In one embodiment, the third temperature may be 260-320° C., and a time-period for performing the outer-shell growth under the third temperature condition may be 15 minutes-90 minutes. The third temperature may be the growth temperature of the group II-VI semiconductor outer-shell. Within such temperature and time-period range, the group II-VI semiconductor outer-shell may be substantially well formed.

In one embodiment, after obtaining the core-shell quantum dot solution, the fabrication method may further include performing a solid-liquid separation on the core-shell quantum dot solution, and then performing a vacuum drying. Specifically, the core-shell quantum dot solution may be centrifuged and precipitated, and ultimately may be dried under vacuum for 12-24 hours to obtain a solid core-shell quantum dot.

In the fabrication method of the quantum dot in the disclosed embodiments of the present disclosure, cation precursors with different activities may be used to prepare quantum dots with different light-emitting properties, e.g., a quantum dot with a narrow peak width, a quantum dot with high luminous efficiency, or a quantum dot with high stability. For example, the obtained quantum dot may include a group III-V quantum dot core and at least one type of halide ions, acetylacetonate ions, and hydroxyl ions bound to the surface of the group III-V quantum dot core. Further, the halide ions, the acetylacetonate ions and the hydroxyl ions may be bound with the group III cations on the surface of the group III-V quantum dot core. For example, the obtained quantum dot may include a group III-V quantum dot core, group II cations bound to group V anions on the surface of the group III-V quantum dot core, and at least one type of halide ions, acetylacetonate ions, and hydroxyl ions bound with the group II cations and the group III cations on the surface of the group III-V quantum dot core.

One embodiment of the present disclosure provides a quantum dot including a group III-V quantum dot core and halide ions bound to the surface of the group III-V quantum dot core, where the halide ions may be bound with the group III cations on the surface of the group III-V quantum dot core.

Another embodiment of the present disclosure provides a quantum dot including a group III-V quantum dot core, group II cations bound to the surface of the group III-V quantum dot core, and halide ions bound with the group III cations and the group II cations on the surface of the group III-V quantum dot core.

The group III-V quantum dot may be formed by bonding with covalent bonds, such that the surface of group III-V quantum dot may contain a large number of defect states. The presence of the defect states may cause non-radiative transition of quantum dot, thereby greatly reducing the luminous efficiency of the quantum dot itself. In the quantum dot in the disclosed embodiments of the present disclosure, the halide ions may be bound with metal cations (e.g., group III cations, or group III cations and group II cations) on the surface of the group III-V quantum dot core, which may be equivalent to fully or non-fully covering a layer of metal halide on the surface of the quantum dot core. The metal halide may passivate the surface of the group III-V quantum dot core, and may also act as a transitional outer-shell, thereby substantially effectively suppressing the occurrence of non-radiative transition and greatly improving the luminous efficiency of the quantum dot (luminous efficiency may be greater than 70%).

In one embodiment, a material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb, and InPGa. The group III cations may be selected from at least one type of indium ions, gallium ions and aluminum ions. The group II cations may be selected from at least one type of zinc ions, cadmium ions, mercury ions and magnesium ions. The halide ions may be selected from at least one type of chloride ions, bromide ions, and iodide ions. Specifically, for the group III-V quantum dot core, these halide ions may be bound with the surface group III cations, which may be equivalent to fully or non-fully covering a layer of metal halide, e.g., at least one of indium chloride, indium bromide, indium iodide, gallium chloride, gallium bromide, gallium iodide, aluminum chloride, aluminum bromide and aluminum iodide, on the surface of the quantum dot core. When the surface of the group III-V quantum dot core contains group II cations bound to the core surface, these halide ions may be simultaneously bound with the group III cations and the group II cations on the surface of the group III-V quantum dot core, which may be equivalent to fully or non-fully covering a layer of metal halide on the surface of the quantum dot core. Thus, the metal halide may include the group III metal halide, e.g., at least one of indium chloride, indium bromide, indium iodide, gallium chloride, gallium bromide, gallium iodide, aluminum chloride, aluminum bromide and aluminum iodide, and the group II metal halide, e.g., at least one of zinc chloride, zinc bromide, zinc iodide, cadmium chloride, cadmium bromide, cadmium iodine, magnesium chloride, magnesium bromide, magnesium iodide, mercury chloride, mercury bromide, and mercury iodide.

In one embodiment, the surface of the group III-V quantum dot core may be coated with a layer of group II-VI semiconductor outer-shell, and the group II-VI semiconductor outer-shell may cover the group III-V quantum dot core and the halide ions bound to the surface of the group III-V quantum dot core. Alternatively, in another embodiment, the surface of the group III-V quantum dot core may be coated with a layer of group II-VI semiconductor outer-shell, and the group II-VI semiconductor outer-shell may cover the group III-V quantum dot core and the group II metal ions and halide ions bound to the surface of the group III-V quantum dot core. The halide ions may be located between the group III-V quantum dot core and the group II-VI semiconductor outer-shell. In this way, the core-shell quantum dot structure, formed by the cooperative action of the metal halide formed by the halide ions and the metal cations on the surface of the group III-V quantum dot core and the group II-VI semiconductor outer-shell, may substantially effectively separate the carriers confined in the core and the surface states acting as non-radiative recombination transition centers, thereby greatly improving the luminous efficiency thereof. In one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

In one embodiment of the present disclosure, a fabrication method of the above quantum dot may include following steps.

SA011: Providing a group III cation precursor and ligand, where the group III cation precursor may include one or more metal halide precursors; dissolving the group III cation precursor and ligand in a solvent; and performing a heating treatment under a first temperature condition to obtain a mixed solution.

SA012: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB011: Providing a group III cation precursor, a first group II cation precursor and ligand, where the group III cation precursor may include one or more metal halide precursors, and/or the first group II cation precursor may include one or more metal halide precursors; dissolving the group III cation precursor, the first group II cation precursor and ligand in a solvent, and performing a heating treatment under a first temperature condition to obtain a mixed solution.

SB012: Continuously heating the mixed solution to a second temperature, then adding a group V anion precursor to the mixed solution, and performing a nucleation reaction to obtain a group III-V quantum dot core solution.

In the above fabrication method of the quantum dot, before performing the nucleation reaction, at least one metal halide precursor may be introduced into the precursor, and the cations in the metal halide precursor may be used for the nucleation reaction. On the other hand, anions, i.e., halide ions, may react with dangling bonds of group V anions on the surface of nucleated group III-V quantum dot core, and the generated $VX_3$ (V may be N, P, or As, X may be halogen) gas may facilitate occurrence of the reaction. Therefore, the group III and group V atoms on the surface of the group III-V quantum dot core may be recombined to form a group III-V quantum dot core with a substantially stable atomic ratio. At the same time, the halide ions may be bound with the cations (e.g., group III cations, or group III cations and group II cations) on the surface of the group III-V quantum dot core, which may be equivalent to fully or non-fully covering a layer of metal halide on the surface of the group III-V quantum dot core. The metal halide may not only passivate the surface of the group III-V quantum dot core, but also act as a transitional outer-shell, thereby substantially effectively suppressing the occurrence of non-radiative transition and greatly improving the luminous efficiency of the quantum dot. The fabricated quantum dot may have a substantially high luminous efficiency (greater than 70%).

Specifically, in the above step SA011, the group III cation precursor may include one or more metal halide precursors. In other words, the group III cation precursor may merely include a metal halide precursor, or in addition to the metal halide precursor, may include any other precursor, e.g., aluminum isopropoxide, indium acetate, indium carbonate, indium nitrate, indium perchlorate, indium cyanide, gallium carbonate, gallium nitrate, gallium perchlorate, gallium cyanide, aluminum carbonate, aluminum nitrate, aluminum perchlorate, aluminum cyanide, etc. The metal halide precursor in the group III cation precursor may be selected from at least one of indium chloride, indium bromide, indium iodide, gallium chloride, gallium bromide, gallium iodide, aluminum chloride, aluminum bromide and aluminum iodide.

In the above step SB011, the group III cation precursor may include one or more metal halide precursors, and/or the first group II cation precursor may include one or more metal halide precursors. It can be understood that the group III cation precursor may include one or more metal halide precursors, or the first group II cation precursor may include one or more metal halide precursors, or the group III cation precursor and the first group II cation precursor may simultaneously include one or more metal halide precursors. When the group III cation precursor includes one or more metal halide precursors, the metal halide precursor may be selected from at least one of indium chloride, indium bromide, indium iodide, gallium chloride, gallium bromide, gallium iodide, aluminum chloride, aluminum bromide, and aluminum iodide. When the first group II cation precursor includes one or more metal halide precursors, the metal halide precursor may be selected from at least one of zinc chloride, zinc bromide, zinc iodide, cadmium chloride, cadmium bromide, cadmium iodide, magnesium chloride, magnesium bromide, magnesium iodine, mercury chloride, mercury bromide and mercury iodide. In addition to the metal halide precursor, the first group II cation precursor may also include any other precursor, e.g., at least one of zinc acetate, zinc stearate, zinc undecylenate, zinc carbonate, zinc nitrate, zinc perchlorate, zinc cyanide, cadmium acetate, cadmium stearate, cadmium undecylenate, cadmium carbonate, cadmium nitrate, cadmium perchlorate, cadmium cyanide, magnesium acetate, magnesium stearate, magnesium undecylenate, magnesium carbonate, magnesium nitrate, magnesium perchlorate, magnesium cyanide, mercury acetate, mercury carbonate, mercury nitrate, mercury perchlorate, and mercury cyanide, etc.

In the step SA011, the halide ions may be bound with the group III cations on the surface of the group III-V quantum dot core to form a metal halide, which may be equivalent to fully or non-fully covering a layer of metal halide on the surface of the group III-V quantum dot core. The metal halide may include at least one of indium chloride, indium bromide, indium iodide, gallium chloride, gallium bromide, gallium iodide, aluminum chloride, aluminum bromide, and aluminum iodide.

In the step SB011, due to the introduction of the first group II cation precursor, the group II cations may be bound with the group V anions (e.g., P) on the surface of the group III-V quantum dot core, thereby forming spare group III cations. The halide ions may be bound with the spare group III cations on the surface of the core, and at the same time, the halide ions may also be bound with the group II cations on the surface of the III-V quantum dot core. In other words, the halide ions may be simultaneously bound with the group III cations and the group II cations on the surface of the III-V quantum dot core, which may be equivalent to fully or non-fully covering a layer of metal halide material composed of group III metal halide and group II metal halide on the surface of the quantum dot core. In this way, the metal halide material may include group III metal halide, e.g., at least one of indium chloride, indium bromide, indium iodide, gallium chloride, gallium bromide, gallium iodide, aluminum chloride, aluminum bromide and aluminum iodide, and group II metals halide, e.g., at least one of zinc chloride, zinc bromide, zinc iodide, cadmium chloride, cadmium bromide, cadmium iodide, magnesium chloride, magnesium bromide, magnesium iodide, mercury chloride, mercury bromide and mercury iodide. The surface of the group III-V quantum dot core may be fully or non-fully coated with the metal halide material composed of the group III metal halide and the group II metal halide, which may substantially effectively cover the entire group III-V quantum dot core, thereby facilitating substantially effectively binding the excitons in the core and greatly improving the luminous efficiency.

After the nucleation reaction in step SA012 or SB012 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution. Because halide ions are bound to the surface of the III-V quantum dot core, the metal halide may act as a transitional outer-shell, which may substantially facilitate the growth of the group II-VI semiconductor outer-shell.

In other words, a layer of group II-VI semiconductor outer-shell may be coated on the surface of the group III-V quantum dot core, and the outer-shell may cover the group III-V quantum dot core and halide ions bound to the surface of the group III-V quantum dot core. Alternatively, a layer of group II-VI semiconductor outer-shell may be coated on the surface of the group III-V quantum dot core, and the outer-shell may cover the group III-V quantum dot core, and group II metal ions and halide ions bound to the surface of the group III-V quantum dot core. The halide ions may be located between the group III-V quantum dot core and the group II-VI semiconductor outer-shell. In this way, the core-shell quantum dot structure, formed by the cooperative action of the metal halide formed by the halide ions and the metal cations on the surface of the group III-V quantum dot core and the group II-VI semiconductor outer-shell, may substantially effectively separate the carriers confined in the core and the surface states acting as non-radiative recombination transition centers, thereby greatly improving the luminous efficiency thereof. Specifically, in one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

The embodiments of the above fabrication method of the quantum dot may be shown in Exemplary Embodiments 1-1 to 1-6.

One embodiment of the present disclosure provides a quantum dot including a group III-V quantum dot core, and acetylacetonate ions bound to the surface of the group III-V quantum dot core. The acetylacetonate ions may be bound with group III cations on the surface of the group III-V quantum dot core.

Another embodiment of the present disclosure provides a quantum dot including a group III-V quantum dot core, group II cations bound to the surface of the group III-V quantum dot core, and acetylacetonate ions bound with group III cations and the group II cations on the surface of the group III-V quantum dot core.

The acetylacetonate ion may have a substantially small radial dimension and bidentate coordination sites, and may exchange with the introduced carboxylic acid and any other ligand. The acetylacetonate ions may be bound with the metal cations (e.g., group III cations, or group III cations and group II cations) on the surface of the group III-V quantum dot core, which may be equivalent to fully or non-fully coating a layer of acetylacetonate metal compound on the surface of the quantum dot core. In this way, the original ligands on the surface of the group III-V quantum dot core may be reduced, and the separation of nucleation and growth may be achieved. Further, the size dispersion of quantum dots may be effectively improved, such that the peak width of the quantum dots may be significantly narrowed, and the peak width range may be <45 nm.

In one embodiment, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb, and InPGa. The group III cations may be selected from at least one type of indium ions, gallium ions, and aluminum ions. The group II cations may be selected from at least one type of zinc ions, cadmium ions, mercury ions and magnesium ions. The acetylacetonate ions may be selected from at least one type of hexahydroacetylacetonate ions and hexafluoroacetylacetonate ions.

Specifically, for the group III-V quantum dot core, hexahydroacetylacetonate ions, hexafluoroacetylacetonate ions and surface group III cations may form at least one of indium hexahydroacetylacetonate, gallium hexahydroacetylacetonate, aluminum hexahydroacetylacetonate, indium hexafluoroacetylacetonate, gallium hexafluoroacetylacetonate, and aluminum hexafluoroacetylacetonate.

Specifically, when the surface of the group III-V quantum dot core contains group II cations bound to the core surface, the acetylacetonate ions may be simultaneously bound with the group III cations and group II cations on the surface of the group III-V quantum dot core, which may be equivalent to fully or non-fully coating a layer of acetylacetonate metal compound on the surface of the quantum dot core. The acetylacetonate metal compound may include a group III metal acetylacetonate compound, e.g., at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate, and a group II metal acetylacetonate compound, e.g., at least one of zinc hexahydroacetylacetonate, cadmium hexahydroacetylacetonate, magnesium hexahydroacetylacetonate, mercury hexahydroacetylacetonate, zinc hexafluoroacetylacetonate, cadmium hexafluoroacetylacetonate, magnesium hexafluoroacetylacetonate and mercury hexafluoroacetylacetonate.

In one embodiment, the surface of the group III-V quantum dot core may be coated with a layer of group II-VI semiconductor outer-shell, and the outer-shell may cover the group III-V quantum dot core and acetylacetonate ions bound to the surface of the III-V quantum dot core. Alternatively, in another embodiment, the surface of the group III-V quantum dot core may be coated with a layer of group II-VI semiconductor outer-shell, and the outer-shell may cover the group III-V quantum dot core, and the group II metal ions and the acetylacetonate ions bound to the surface of the group III-V quantum dot core. The acetylacetonate ions may be located between the group III-V quantum dot core and the group II-VI semiconductor outer-shell. In this way, the core-shell quantum dot structure, formed by the cooperative action of the acetylacetonate metal compound formed by the acetylacetonate ions and the metal cations on the surface of the group III-V quantum dot core and the group II-VI semiconductor outer-shell, may substantially effectively separate the carriers confined in the core and the surface states acting as non-radiative recombination transition centers, thereby greatly improving the luminous efficiency thereof. In one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

In one embodiment of the present disclosure, a fabrication method of the above quantum dot may include following steps.

SA021: Providing a group III cation precursor and ligand, where the group III cation precursor may include one or more acetylacetonate metal salt precursors; dissolving the group III cation precursor and ligand in a solvent; and performing a heating treatment under a first temperature condition to obtain a mixed solution.

SA022: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB021: Providing a group III cation precursor, a first group II cation precursor and ligand, where the group III cation precursor may include one or more acetylacetonate metal salt precursors, and/or the first group II cation precursor may include one or more acetylacetonate metal salt precursors; dissolving the group III cation precursor, the first group II cation precursor and ligand in a solvent, and performing a heating treatment under a first temperature condition to obtain a mixed solution.

SB022: Continuously heating the mixed solution to a second temperature, then adding a group V anion precursor to the mixed solution, and performing a nucleation reaction to obtain a group III-V quantum dot core solution.

Conventional group III-V quantum dot may often be prepared by using a combination of non-ligand solvent and fatty acid ligand. The introduction of fatty acid ligand may increase the reaction speed of the system, enable the nucleation process of the group III-V semiconductor quantum dot to be accelerated, and enable particle size of the formed crystal nucleus to be substantially uniform. However, the fatty acid ligand may be bound with the group III cation through oxygen in the carboxylate. The group III cation may have a larger binding energy with oxygen than the group II cation in a same period. For example, a binding energy of In—O bond may be an order of magnitude larger than a binding energy of Cd—O bond. On the one hand, the carboxylic acid ligand may be tightly bound to In on the surface of the InP quantum dot at a high temperature, such that the distribution of the carboxylic acid ligands on the surface of the InP quantum dot may be much higher than that of the group II-VI quantum dots. On the other hand, the tight binding between the carboxylic acid ligand and In on the surface of the InP quantum dot may not facilitate the subsequent separation during the nucleation stage. Therefore, removing the dense carboxylic acid ligands on the surface of the group III-V quantum dot may be very necessary for achieving the separation of nucleation and growth. In the above fabrication method in the disclosed embodiments of the present disclosure, before performing the nucleation reaction, at least one acetylacetonate metal salt precursor may be introduced into the precursor, and the cations in the acetylacetonate metal salt precursor may be used for the nucleation reaction. On the other hand, at the moment of nucleation, because the acetylacetonate ion has a substantially small radial dimension and more (2) coordination sites, the acetylacetonate ions may exchange with the carboxylic acid ligands and may be bound with metal cations (e.g., group III cations, or group III cations and group II cations) on the surface of the group III-V quantum dot core, which may be equivalent to fully or non-fully coating a layer of acetylacetonate metal compound on the surface of the quantum dot core. Therefore, the original ligands on the surface of the group III-V quantum dot core may be reduced, and the separation of nucleation and growth may be achieved. The ultimately formed quantum dots may have a desired size dispersion, the peak width may be significantly narrowed, and the peak width range may be <45 nm.

Specifically, in the above step SA021, the group III cation precursor may include one or more acetylacetonate metal salt precursors. In other words, the group III cation precursor may merely include the acetylacetonate metal salt precursor, or may include any other precursor in addition to the one or more acetylacetonate metal salt precursors. The acetylacetonate metal salt precursor in the group III cation precursor may be selected from at least one of indium acetylacetonate, indium hexafluoroacetylacetonate, gallium acetylacetonate, gallium hexafluoroacetylacetonate, aluminum acetylacetonate, and aluminum hexafluoroacetylacetonate.

In the above step SB021, the group III cation precursor may include one or more acetylacetonate metal salt precursors, and/or the first group II cation precursor may include one or more acetylacetonate metal salt precursors. It can be understood that the group III cation precursor may include one or more acetylacetonate metal salt precursors, or the first group II cation precursor may include one or more acetylacetonate metal salt precursors, or the group III cation precursor and the first group II cation precursor both may simultaneously include one or more acetylacetonate metal salt precursors. When the group III cation precursor includes one or more acetylacetonate metal salt precursors, the acetylacetonate metal salt precursor may be selected from at least one of indium acetylacetonate, indium hexafluoroacetylacetonate, gallium acetylacetonate, gallium hexafluoroacetylacetonate, aluminum acetylacetonate and aluminum hexafluoroacetylacetonate. When the first group II cation precursor includes one or more acetylacetonate metal salt precursors, the acetylacetonate metal salt precursor may be selected from at least one of zinc acetylacetonate, zinc hexafluoroacetylacetonate, cadmium acetylacetonate, cadmium hexafluoroacetylacetonate, magnesium acetylacetonate, magnesium hexafluoroacetylacetonate and mercury acetylacetonate. The group II cation precursor may include any other precursor.

In step SA021, the acetylacetonate ions may be bound with the group III cations on the surface of the group quantum dot core to form at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate.

In step SB021, after adding the group II cation precursor, the group II cations may be bound with the group V anions (e.g., P) on the surface of the group III-V quantum dot core, thereby forming spare group III cations. The small molecule acetylacetonate ion ligand may exchange with the carboxylic acid on the surface of the group III cation. Therefore, the acetylacetonate ions may be bound with the group III cations on the core surface, and at the same time, the acetylacetonate ions may also be bound with the group II cations bound to the surface of the group III-V quantum dot core. In other words, the acetylacetonate ions may be simultaneously bound with the group III cations and the group II cations on the surface of the group III-V quantum dot core, which may be equivalent to fully or non-fully coating a layer of acetylacetonate metal compound composed of a group III metal acetylacetonate compound and a group II metal acetylacetonate compound on the surface of the quantum dot core. The group III metal acetylacetonate compound may include at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate. The group II metal acetylacetonate compound may include at least one of zinc hexahydroacetylacetonate, cadmium hexahydroacetylacetonate, magnesium hexahydroacetylacetonate, mercury hexahydroacetylacetonate, zinc hexafluoroacetylacetonate, cadmium hexafluoroacetylacetonate, magnesium hexafluoroacetylacetonate and mercury hexafluoroacetylacetonate.

After the nucleation reaction in step SA022 or SB022 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution.

In other words, a layer of group II-VI semiconductor outer-shell may be coated on the surface of the group III-V quantum dot core, and the outer-shell may cover the group III-V quantum dot core, and acetylacetonate ions bound to the surface of the group III-V quantum dot core. Alternatively, a layer of group II-VI semiconductor outer-shell may be coated on the surface of the group III-V quantum dot core, and the outer-shell may cover the group III-V quantum dot core, and group II metal ions and acetylacetonate ions bound to the surface of the group III-V quantum dot core. The acetylacetonate ions may be located between the group III-V quantum dot core and the group II-VI semiconductor outer-shell. In this way, the core-shell quantum dot structure, formed by the cooperative action of the acetylacetonate metal compound formed by the acetylacetonate ions and the metal cations on the surface of the group III-V quantum dot core and the group II-VI semiconductor outer-shell, may substantially effectively separate the carriers confined in the core and the surface states acting as non-radiative recombination transition centers, thereby greatly improving the luminous efficiency thereof. Specifically, in one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

The embodiments of the above fabrication method of the quantum dot may be shown in Exemplary Embodiments 2-1 to 2-6.

One embodiment of the present disclosure provides a quantum dot including a group III-V quantum dot core, and halide ions and acetylacetonate ions bound to the surface of the group III-V quantum dot core, where the halide ions and acetylacetonate ions may be bound with group III cations on the surface of the group III-V quantum dot core. Another embodiment of the present disclosure provides a quantum dot including a group III-V quantum dot core, group II cations bound with group V anions on the surface of the group III-V quantum dot core, and halide ions and acetylacetonate ions bound with group III cations and the group II cations on the surface of the group III-V quantum dot core. In the quantum dots in the disclosed embodiments, the halide ions and acetylacetonate ions may be simultaneously bound to the surface of the group III-V quantum dot core, which may be equivalent to fully or non-fully covering a layer of mixed material composed of metal halide and acetylacetonate metal compound on the surface of the group III-V quantum dot core. The halide ions may be bound with the metal cations on the surface of the group III-V quantum dot core to passivate the surface of the group III-V quantum dot core, which may effectively suppress the occurrence of non-radiative transition, thereby avoiding a large number of defect states on the surface of the group III-V quantum dot formed by covalent bonding. The acetylacetonate ion may have a substantially small radial dimension and bidentate coordination sites, which may exchange with the introduced carboxylic acid ligand. In this way, the original ligands on the surface of the group III-V quantum dot core may be reduced, and the separation of nucleation and growth may be achieved. Therefore, the halide ions and acetylacetonate ions may be bound with the cations on the surface of the group III-V quantum dot core to form a layer of mixed material composed of metal halide and acetylacetonate metal compound, which may not only passivate the surface of the group III-V quantum dot core and greatly improve the luminous efficiency of the quantum dot, and at the same time, but also improve the size dispersion of the quantum dots, thereby significantly narrowing the peak width. The ultimate quantum dot may have a luminous efficiency greater than 70%, and a peak width range <45 nm.

In one embodiment, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb and InPGa. The group III cations may be selected from at least one type of indium ions, gallium ions, and aluminum ions. The halide ions may be selected from at least one type of chloride ions, bromide ions, and iodide ions. The acetylacetonate ions may be selected from at least one type of hexahydroacetylacetonate ions and hexafluoroacetylacetonate ions.

Specifically, for the group III-V quantum dot core, hexahydroacetylacetonate ions, hexafluoroacetylacetonate ions and the group III cations on the surface of the group III-V quantum dot core may form at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate. Halide ions and the group III cations on the surface of the group III-V quantum dot core may form at least one of indium chloride, indium bromide, indium iodide, gallium chloride, gallium bromide, gallium iodide, aluminum chloride, aluminum bromide and aluminum iodide. In one embodiment, the quantum dot may further include an outer-shell. The outer-shell may be made of a group II-VI semiconductor material, and the outer-shell may cover the group III-V quantum dot core, and the halide ions and acetylacetonate ions bound to the surface of the quantum dot core. The halide ions and the acetylacetonate ions may be located between the group III-V quantum dot core and the outer-shell composed of the group II-VI semiconductor material. In this way, the core-shell quantum dot structure, formed by the cooperative action of the halide ions, acetylacetonate ions and group II-VI semiconductor outer-shell, may have a substantially high luminous efficiency. In one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

Specifically, when the surface of the group III-V quantum dot core contains group II cations bound to the core surface, the acetylacetonate ions may be simultaneously bound with the group III cations and group II cations on the surface of the group III-V quantum dot core, which may be equivalent to fully or non-fully coating a layer of mixed material composed of acetylacetonate metal compound and metal halide on the surface of the quantum dot core. The acetylacetonate metal compound may include a group III metal acetylacetonate compound, e.g., at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate, and a group II metal acetylacetonate compound, e.g., at least one of zinc hexahydroacetylacetonate, cadmium hexahydroacetylacetonate, magnesium hexahydroacetylacetonate, mercury hexahydroacetylacetonate, zinc hexafluoroacetylacetonate, cadmium hexafluoroacetylacetonate, magnesium hexafluoroacetylacetonate and mercury hexafluoroacetylacetonate. The metal halide may be selected from a group III metal halide, e.g., at least one of indium chloride, indium bromide, indium iodide, gallium chloride, gallium bromide, gallium iodide, aluminum chloride, aluminum bromide and aluminum iodide, and a group II metal halide, e.g., at least one of zinc chloride, zinc bromide, zinc iodide, cadmium chloride, cadmium bromide, cadmium iodide, magnesium chloride, magnesium bromide, magnesium iodide, mercury chloride, mercury bromide and mercury iodide.

In one embodiment, the quantum dot may further include an outer-shell. The outer-shell may be made of a group II-VI semiconductor material, and the outer-shell may cover the group III-V quantum dot core, and the group II cations, the halide ions and acetylacetonate ions bound to the surface of the group III-V quantum dot core. The halide ions and the acetylacetonate ions may be located between the group III-V quantum dot core and the outer-shell composed of the group II-VI semiconductor material. In this way, the core-shell quantum dot structure, formed by the cooperative action of the halide ions, acetylacetonate ions and group II-VI semiconductor outer-shell, may have a substantially high luminous efficiency. In one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

In one embodiment of the present disclosure, a fabrication method of the above quantum dot may include following steps.

SA031: Providing a group III cation precursor and ligand, where the group III cation precursor may include one or more acetylacetonate metal salt precursors and one or more metal halide precursors; dissolving the group III cation precursor and ligand in a solvent; and performing a heating treatment under a first temperature condition to obtain a mixed solution.

SA032: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB031: Providing a cation precursor and ligand, where the cation precursor may include a group III cation precursor and a first group II cation precursor, the cation precursor may include one or more acetylacetonate metal salt precursors and one or more metal halide precursors; dissolving the cation precursor and ligand in a solvent; and performing a heating treatment under a first temperature condition to obtain a mixed solution.

SB032: Continuously heating the mixed solution to a second temperature, then adding a group V anion precursor to the mixed solution, and performing a nucleation reaction to obtain a group III-V quantum dot core solution.

In the above fabrication method in the disclosed embodiments of the present disclosure, before performing the nucleation reaction, at least one acetylacetonate metal salt precursor and at least one metal halide precursor may be first introduced into the precursor. In this way, the metal cations in the acetylacetonate metal salt precursor may be used for the nucleation reaction in the fabrication process. On the one hand, at the moment of nucleation, because the acetylacetonate ion has a substantially small radial dimension and more (2) coordination sites, the acetylacetonate ion may exchange with the carboxylic acid ligand. Thus, the original ligands on the surface of the group III-V quantum dot core may be reduced, and the separation of nucleation and growth may be achieved. The cations in the metal halide precursor may also be used for nucleation reaction. On the other hand, the halide ions may react with dangling bonds of group V anions on the surface of nucleated group III-V quantum dot core, and the generated $VX_3$ (V may be N, P, or As, X may be halogen) gas may facilitate occurrence of the reaction. Therefore, the group III and group V atoms on the surface of the group III-V quantum dot core may be recombined to form a group III-V quantum dot core with a substantially stable atomic ratio. At the same time, the halide ions may be bound with the cations on the surface of the group III-V quantum dot core to passivate the surface of the group III-V quantum dot core. Ultimately, the halide ions and acetylacetonate ions may be simultaneously bound with cations on the surface of nucleated group III-V quantum dot core, which may be equivalent to fully or non-fully coating a layer of mixed material composed of acetylacetonate metal compound and metal halide on the surface of the quantum dot core. In view of this, not only the surface of the group III-V quantum dot core may be passivated, and the luminous efficiency of the quantum dot may be greatly improved, and at the same time, but also the size dispersion of the quantum dots may be improved, and the peak width may be significantly narrowed. The ultimate quantum dot may have a luminous efficiency greater than 70%, and a peak width range <45 nm.

Specifically, in the above step SA031, the group III cation precursor may include one or more acetylacetonate metal salt precursors and one or more metal halide precursors. In other words, the group III cation precursor may merely include the acetylacetonate metal salt precursor and the metal halide precursor, or may include any other precursor in addition to the acetylacetonate metal salt precursor and the metal halide precursor. The acetylacetonate metal salt precursor in the group III cation precursor may be selected from at least one of indium acetylacetonate, indium hexafluoroacetylacetonate, gallium acetylacetonate, gallium hexafluoroacetylacetonate, aluminum acetylacetonate, and aluminum hexafluoroacetylacetonate. The metal halide precursor may be selected from at least one of indium chloride, indium bromide, indium iodine, gallium chloride, gallium bromide, gallium iodide, aluminum chloride, aluminum bromide and aluminum iodide.

In the above step SB031, the cation precursor (the group III cation precursor and the first group II cation precursor) including one or more acetylacetonate metal salt precursors and one or more metal halide precursors may be understood as following situations. (1) The group III cation precursor may include one or more acetylacetonate metal salt precursors and one or more metal halide precursors. (2) The first group II cation precursor may include one or more acetylacetonate metal salt precursors and one or more metal halide precursors. (3) The group III cation precursor may include one or more acetylacetonate metal salt precursors (the group III cation precursors may also include one or more metal halide precursors), and the first group II cation precursor may include one or more metal halide precursors (the first group II cation precursor may also include one or more acetylacetonate metal salt precursors). (4) The group III cation precursor may include one or more metal halide precursors (the group III cation precursor may also include one or more acetylacetonate metal salt precursors), and the first group II cation precursor may include one or more acetylacetonate metal salt precursors (the first group II cation precursor may also include one or more metal halide precursors). As long as the cation precursor composed of the group III cation precursor and the first group II cation precursor contains halide ions and acetylacetonate ions simultaneously, various situations may be understood.

In step SA031, the halide ions and acetylacetonate ions may be simultaneously bound with the group III cations on the surface of the group III-V quantum dot core, which may be equivalent to fully or non-fully coating a layer of mixed material composed of group III metal acetylacetonate compound and group III metal halide on the surface of the group III-V quantum dot core.

In step SB031, after adding the first group II cation precursor, the group II cations may be bound with the group V anions (e.g., P) on the surface of the group III-V quantum dot core, thereby forming spare group III cations. The small molecule halide ion and acetylacetonate ion ligand both may be bound with the group III cations on the core surface, and at the same time, the halide ions and acetylacetonate ions may also be bound with the group II cations bound to the surface of the group III-V quantum dot core. In other words, the halide ions and acetylacetonate ions may be simultaneously bound with the group III cations and the group II cations on the surface of the group III-V quantum dot core, which may be equivalent to fully or non-fully coating a layer of mixed material composed of a group II metal acetylacetonate compound, a group III metal acetylacetonate compound, a group II metal halide and a group III metal halide on the surface of the quantum dot core.

After the nucleation reaction in step SA032 or SB032 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution.

In other words, a layer of group II-VI semiconductor outer-shell may be coated on the surface of the group III-V quantum dot core, and the outer-shell may cover the group III-V quantum dot core, and halide ions and acetylacetonate ions bound to the surface of the group III-V quantum dot core. Alternatively, a layer of group II-VI semiconductor outer-shell may be coated on the surface of the group III-V quantum dot core, and the outer-shell may cover the group III-V quantum dot core, and the group II metal ions, acetylacetonate ions and halide ions bound to the surface of the group III-V quantum dot core. The halide ions and acetylacetonate ions may be located between the group III-V quantum dot core and the group II-VI semiconductor outer-shell. In this way, the core-shell quantum dot structure, formed by the cooperative action of the metal halide and the acetylacetonate metal compound, which may be respectively formed by the halide ions and acetylacetonate ions and the metal cations on the surface of the group III-V quantum dot core, and the group II-VI semiconductor outer-shell, may substantially effectively separate the carriers confined in the core and the surface states acting as non-radiative recombination transition centers, thereby greatly improving the luminous efficiency thereof. Specifically, in one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

The embodiments of the above fabrication method of the quantum dot may be shown in Exemplary Embodiments 3-1 to 3-6.

One embodiment of the present disclosure provides a quantum dot including a group III-V quantum dot core, and hydroxyl ions bound to the surface of the group III-V quantum dot core, where the hydroxyl ions may be bound with group III cations on the surface of the group III-V quantum dot core.

Another embodiment of the present disclosure provides a quantum dot including a group III-V quantum dot core, group II cations bound with group V anions on the surface of the group III-V quantum dot core, and hydroxyl ions bound with group III cations and the group II cations on the surface of the group III-V quantum dot core.

In the quantum dot in the disclosed embodiment, the hydroxyl ions may be bound with the group III metal cations on the surface of the group III-V quantum dot core, which may be equivalent to forming a layer of metal hydroxide fully or non-fully covering the quantum dot core on the surface of the group III-V quantum dot core, may not only passivate the surface of the group III-V quantum dot core, but also act as a buffer outer-shell. The lattice mismatch issue between the group III-V quantum dot core and the group II-VI semiconductor outer-shell may be effectively reduced, which may facilitate the growth of a thick outer-shell. Therefore, the binding of the hydroxyl ions on the surface of the group III-V quantum dot core may greatly improve the stability of the quantum dot. The group III cations may be selected from at least one type of indium ions, gallium ions, and aluminum ions. The group II cations may be selected from at least one type of zinc ions, cadmium ions, mercury ions and magnesium ions. In one embodiment, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb and InPGa.

Specifically, for the group III-V quantum dot core, hydroxyl ions and the surface group III cations may form a structure equivalent to a metal hydroxide layer, e.g., at least one of indium hydroxide, gallium hydroxide and aluminum hydroxide. In one embodiment, the quantum dot may further include an outer-shell. The outer-shell may be made of a group II-VI semiconductor material, and the outer-shell may cover the group III-V quantum dot core, and the hydroxyl ions bound to the surface of the quantum dot core. Specifically, the group II-VI semiconductor material may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

Specifically, when the surface of the group III-V quantum dot core contains group II cations bound to the core surface, the hydroxyl ions may be simultaneously bound with the group III cations and group II cations on the surface of the group III-V quantum dot core, to form a layer of metal hydroxide fully or non-fully coating the surface of the quantum dot core. In this way, the metal hydroxide may include group III metal hydroxide, e.g., at least one of indium hydroxide, gallium hydroxide and aluminum hydroxide, and group II metal hydroxide, e.g., at least one of zinc hydroxide, cadmium hydroxide, magnesium hydroxide, and mercury hydroxide. In one embodiment, the quantum dot may further include an outer-shell, and the outer-shell may be made of a group II-VI semiconductor material. The outer-shell may cover the group III-V quantum dot core, and the group II cations and hydroxyl ions bound to the surface of the group III-V quantum dot core. The hydroxyl ions may be located between the group III-V quantum dot core and the group II-VI semiconductor outer-shell.

In this way, the core-shell quantum dot structure, formed by the cooperative action of the structure equivalent to the metal hydroxide layer, which is formed by the hydroxyl ions and the metal cations on the surface of the group III-V quantum dot core, and the group II-VI semiconductor outer-shell, may have a substantially high luminous efficiency. In one embodiment, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

In one embodiment, a thickness of the outer-shell composed of the group II-VI semiconductor material may be 3-5 nm. Due to the presence of the metal hydroxide layer, the thickness of the group II-VI semiconductor outer-shell may increase, to further improve the luminous efficiency of core-shell quantum dot.

In one embodiment of the present disclosure, a fabrication method of the above quantum dot may include following steps.

SA041: Providing a group III cation precursor and ligand, where the group III cation precursor may include one or more metal oxide precursors and/or one or more metal hydroxide precursors; dissolving the group III cation precursor and ligand in a solvent; and performing a heating treatment under a first temperature condition to obtain a mixed solution.

SA042: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB041: Providing a cation precursor and ligand, where the cation precursor may include a group III cation precursor and a first group II cation precursor, the cation precursor may include one or more metal oxide precursors and/or one or more metal hydroxide precursors; dissolving the cation precursor and ligand in a solvent; and performing a heating treatment under a first temperature condition to obtain a mixed solution.

SB042: Continuously heating the mixed solution to a second temperature, then adding a group V anion precursor to the mixed solution, and performing a nucleation reaction to obtain a group III-V quantum dot core solution.

In the above fabrication method in the disclosed embodiments of the present disclosure, before performing the nucleation reaction, at least one metal oxide precursor and/or metal hydroxide precursor may be first introduced into the precursor. In this way, in the fabrication process, the metal cations in the metal oxide precursor and/or metal hydroxide precursor may participate in the formation of group III-V quantum dot core. However, the anion in the metal oxide precursor, i.e., $O^{2-}$, may be first bound with proton in the reaction system solution to form $OH^-$, and $OH^-$ may be quickly bound with cations (e.g., group III cations, or group III cations and group II cations) on the surface of group III-V quantum dot core to form a layer of metal oxide layer fully or non-fully coating the surface of the group III-V quantum dot, which may not only effectively passivate the surface of the group III-V quantum dot core, but also act as a layer of buffer outer-shell to effectively reduce the lattice mismatch issue between the core and the outer-shell, thereby facilitating the growth of thick outer-shell.

In the above step SA041, the group III cation precursor may include one or more metal oxide precursors and/or one or more metal hydroxide precursors. In other words, the group III cation precursor may merely include one or more metal oxide precursors, or the group III cation precursor may merely include one or more metal hydroxide precursors, or the group III cation precursor may simultaneously include one or more metal oxide precursors and one or more metal hydroxide precursors. In addition, the group III cation precursor may include any other precursor in addition to the one or more metal oxide precursors and/or metal hydroxide precursors. When the group III cation precursor includes one or more metal oxide precursors, the metal oxide precursor may be selected from at least one of indium oxide, gallium oxide, and aluminum oxide; and/or, when the group III cation precursor includes one or more metal hydroxide precursors, the group III metal hydroxide precursor may be selected from at least one of indium hydroxide, gallium hydroxide, and aluminum hydroxide.

In the above step SB041, the cation precursor (the group III cation precursor and the first group II cation precursor) including one or more metal oxide precursors and/or one or more metal hydroxide precursors may be understood as following situations. (1) The group III cation precursor may include one or more metal oxide precursors and/or metal hydroxide precursors. In this case, the group III cation precursor may merely include one or more metal oxide precursors, or the group III cation precursor may merely include one or more metal hydroxide precursors, or the group III cation precursor may simultaneously include one or more metal oxide precursors and one or more metal hydroxide precursors. (2) The first group II cation precursor may include one or more metal oxide precursors and/or metal hydroxide precursors. In this case, the first group II cation precursor may merely include one or more metal oxide precursors, or the first group II cation precursor may merely include one or more metal hydroxide precursors, or the first group II cation precursor may simultaneously include one or more metal oxide precursors and one or more metal hydroxide precursors. (3) The group III cation precursor may include one or more metal oxide precursors, and the first group II cation precursor may include one or more metal oxide precursors and/or metal hydroxide precursors. (4) The group III cation precursor may include one or more metal hydroxide precursors, and the first group II cation precursor may include one or more metal oxide precursors and/or metal hydroxide precursors. (5) The group III cation precursor may include one or more metal oxide precursors and one or more metal hydroxide precursors, and the first group II cation precursor may include one or more metal oxide precursors and metal hydroxide precursors. As long as the mixture composed of the group III cation precursor and the first group II cation precursor contains $O^{2-}$ and/or $OH^-$, various situations may be understood. For the one or more metal oxides and/or metal hydroxides in the group III cation precursor, the metal oxide may be selected from at least one of indium oxide, gallium oxide, and aluminum oxide, and the metal hydroxide may be selected from at least one of indium hydroxide, gallium hydroxide, and aluminum hydroxide. For the metal oxide precursors and/or metal hydroxide precursors in the first group II cation precursor, the group II metal oxide may be selected from at least one of zinc oxide, cadmium oxide, magnesium oxide and mercury oxide, and the group II metal hydroxide may be selected from at least one of zinc hydroxide, cadmium hydroxide, magnesium hydroxide, and mercury hydroxide. In addition to the metal oxide and/or metal hydroxide, the first group II cation precursor may include any other precursor.

In step SA041, the group III cation precursor may include one or more metal oxides and/or metal hydroxides. The anion in the metal oxide, e.g., $O^{2-}$, may be first bound with proton in the reaction system solution to form $OH^-$, and $OH^-$ may be bound with the group III cations on the surface of the group III-V quantum dot core, which may be equivalent to forming a layer of metal hydroxide coating the quantum dot core on the surface of the quantum dot core. The metal hydroxide may be at least one of indium hydroxide, gallium hydroxide, and aluminum hydroxide.

In step SB041, after introducing the first group II cation precursor, the group II cations may be bound with the group V anions (e.g., P) on the surface of the group III-V quantum dot core, thereby forming spare group III cations. OH— may be bound with the group III cations on the core surface, and at the same time, $OH^-$ may also be bound with the group II cations bound to the surface of the group III-V quantum dot core, which may be equivalent to forming a layer of mixed material composed of group II metal hydroxide and group III metal hydroxide coating the quantum dot core on the surface of the quantum dot core. In this way, the group III metal hydroxide may include at least one of indium hydroxide, gallium hydroxide, and aluminum hydroxide, and the group II metal hydroxide may include at least one of zinc hydroxide, cadmium hydroxide, magnesium hydroxide and mercury hydroxide.

After the nucleation reaction in step SA042 or SB042 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution.

In other words, a layer of group II-VI semiconductor outer-shell may be coated on the surface of the group III-V quantum dot core, and the outer-shell may cover the group III-V quantum dot core, and the hydroxyl ions bound to the surface of the group III-V quantum dot core. Alternatively, a layer of group II-VI semiconductor outer-shell may be coated on the surface of the group III-V quantum dot core, and the outer-shell may cover the group III-V quantum dot core, and group II cations and hydroxyl ions bound to the surface of the group III-V quantum dot core. The hydroxyl ions may be located between the group III-V quantum dot core and the group II-VI semiconductor outer-shell. In this way, the core-shell quantum dot structure, formed by the cooperative action of the structure equivalent to the metal hydroxide layer formed by the hydroxyl ions and the metal cations on the surface of the group III-V quantum dot core and the group II-VI semiconductor outer-shell, may have substantially high luminous efficiency. Specifically, the material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS.

The embodiments of the above fabrication method of the quantum dot may be shown in Exemplary Embodiments 4-1 to 4-6.

One embodiment of the present disclosure provides a quantum dot including a group III-V quantum dot core, and halide ions and hydroxyl ions bound to the surface of the group III-V quantum dot core, where the halide ions and hydroxyl ions may be bound with group III cations on the surface of the group III-V quantum dot core.

Another embodiment of the present disclosure provides a quantum dot including a group III-V quantum dot core, group II cations bound with group V anions on the surface of the group III-V quantum dot core, and halide ions and hydroxyl ions bound with group III cations and the group II cations on the surface of the group III-V quantum dot core.

In the quantum dot in the disclosed embodiments, the halide ions and hydroxyl ions may be bound with cations on the surface of the group III-V quantum dot core, which may be equivalent to fully or non-fully covering a layer of mixed material layer composed of metal halide and metal hydroxide on the surface of the quantum dot core. The halide ions may be bound with metal cations on the surface of the group III-V quantum dot core to passivate the surface of the group III-V quantum dot core, which may effectively suppress the occurrence of non-radiative transition, thereby avoiding a large number of defect states on the surface of the group III-V quantum dot formed by covalent bonding. The binding between the hydroxyl ions and the metal cations on the surface of the group III-V quantum dot core may not only passivate the surface of the group III-V quantum dot, and at the same time, but also act as a layer of buffer outer-shell. The lattice mismatch issue between the group III-V quantum dot core and the group II-VI semiconductor outer-shell may be effectively reduced, which may facilitate the growth of thick outer-shell, may improve luminous efficiency of the quantum dot (greater than 70%), and may improve the stability of the quantum dot.

Specifically, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb, and InPGa. The group III cations may be selected from at least one type of indium ions, gallium ions, and aluminum ions. The group II cations may be selected from at least one type of zinc ions, cadmium ions, mercury ions and magnesium ions. The halide ions may be selected from at least one type of chloride ions, bromide ions, and iodide ions. The group III metal hydroxide formed by hydroxyl ions may include at least one of indium hydroxide, gallium hydroxide and aluminum hydroxide. The group II metal hydroxide formed by hydroxyl ions may include at least one of zinc hydroxide, cadmium hydroxide, magnesium hydroxide and mercury hydroxide. The group III metal halide formed by halide ions may include at least one of indium chloride, indium bromide, indium iodide, gallium chloride, gallium bromide, gallium iodide, aluminum chloride, aluminum bromide, and aluminum iodide. The group II metal halide formed by halide ions may include at least one of zinc chloride, zinc bromide, zinc iodide, cadmium chloride, cadmium bromide, cadmium iodide, magnesium chloride, magnesium bromide, magnesium iodide, mercury chloride, mercury bromide and mercury iodide.

In one embodiment, the surface of the group III-V quantum dot core may be coated with a layer of group II-VI semiconductor outer-shell, and the outer-shell may cover the group III-V quantum dot core, and halide ions and hydroxyl ions bound to the surface of the group III-V quantum dot core. The halide ions and the hydroxyl ions may be located between the group III-V quantum dot core and the group II-VI semiconductor outer-shell.

In another embodiment, the surface of the group III-V quantum dot core may be coated with a layer of group II-VI semiconductor outer-shell, and the outer-shell may cover the group III-V quantum dot core, and the group II cations, halide ions and hydroxyl ions bound to the surface of the group III-V quantum dot core. The halide ions and the hydroxyl ions may be located between the group III-V quantum dot core and the group II-VI semiconductor outer-shell.

In this way, the halide ions may passivate the surface of the group III-V quantum dot core, and may effectively suppress the occurrence of non-radiative transition. The hydroxyl ions may enable the lattices of the group III-V quantum dot core and the group II-VI semiconductor outer-shell to be matched. The group II-VI semiconductor outer-shell may substantially effectively separate the carriers confined in the core and the surface states acting as the non-radiative recombination transition centers. In this way, the core-shell quantum dot structure, formed by cooperative action of the halide ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. In one embodiment, a thickness of the group II-VI semiconductor outer-shell may be 3-5 nm.

In one embodiment of the present disclosure, a fabrication method of the above quantum dot may include following steps.

SA051: Providing a group III cation precursor and ligand, where the group III cation precursor may include one or more metal halide precursors, one or more metal oxide precursors and/or one or more metal hydroxide precursors; dissolving the group III cation precursor and ligand in a solvent; and performing a heating treatment under a first temperature condition to obtain a mixed solution.

SA052: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB051: Providing a cation precursor and ligand, where the cation precursor may include a group III cation precursor and a first group II cation precursor, the cation precursor may include one or more metal halide precursors, and one or more metal oxide precursors and/or one or more metal hydroxide precursors; dissolving the cation precursor and ligand in a solvent; and performing a heating treatment under a first temperature condition to obtain a mixed solution.

SB052: Continuously heating the mixed solution to a second temperature, then adding a group V anion precursor to the mixed solution, and performing a nucleation reaction to obtain a group III-V quantum dot core solution.

In the above fabrication method in the disclosed embodiments of the present disclosure, before performing the nucleation reaction, in the nucleation process, at least one metal oxide precursor and/or at least one metal hydroxide precursor as well as at least one metal halide precursor may be first introduced into the precursor. In this way, in the fabrication process, the cations in the metal halide precursor may be used for nucleation reaction. On the other hand, halide ions may react with dangling bonds of group V anions on the surface of nucleated group III-V quantum dot core, and the generated $VX_3$ (V may be N, P, or As, X may be halogen) gas may facilitate occurrence of the reaction. Therefore, the group III and group V atoms on the surface of the group III-V quantum dot core may be recombined to form a group III-V quantum dot core with a substantially stable atomic ratio. At the same time, the halide ions may be bound with cations on the surface of the group III-V quantum dot core to passivate the surface of the group III-V quantum dot core. The metal cations in the metal oxide precursor and/or metal hydroxide precursor may also participate in the formation of group III-V quantum dot core. However, the anion in the metal oxide precursor, i.e., $O^{2-}$, may be first bound with proton in the reaction system solution to form $OH^-$, and ultimately $OH^-$ may be quickly bound with cations on the surface of group III-V quantum dot core. $OH^-$ may be bound with metal cations on the surface of group III-V quantum dot core to form metal hydroxide, which may effectively passivate the surface of the group III-V quantum dot core, may effectively reduce the lattice mismatch issue between the core and the outer-shell, and may facilitate the growth of thick outer-shell. In the quantum dot ultimately obtained by the fabrication method in the disclosed embodiments, the halide ions and the hydroxyl ions may be simultaneously bound to the surface of the group III-V quantum dot core. In this way, through the cooperative action, the surface of the group III-V quantum dot core may be passivated, the luminous efficiency of the quantum dot may be greatly improved, and the ultimate luminous efficiency of the quantum dot may be greater than 70%. At the same time, the growth of thick outer-shell may be facilitated, and the stability of the quantum dot may be greatly improved.

In the above step SA051, the group III cation precursor may include one or more metal halide precursors, and may include one or more metal oxide precursors and/or metal hydroxide precursors, which may be understood as following. (1) The group III cation precursor may simultaneously include one or more metal halide precursors and one or more metal oxide precursors. (2) The group III cation precursor may simultaneously include one or more metal halide precursors and one or more metal hydroxide precursors. (3) The group III cation precursor may simultaneously include one or more metal halide precursors, one or more metal oxide precursors and one or more metal hydroxide precursors. In addition, the group III cation precursor may include any other precursor in addition to the one or more metal halide precursors, the one or more metal oxide precursors and/or metal hydroxide precursors.

In the above step SB051, the cation precursor (the group III cation precursor and the first group II cation precursor) including one or more metal halide precursors, and one or more metal oxide precursors and/or one or more metal hydroxide precursors may be understood as following situations. (1) The group III cation precursor may include one or more metal halide precursors, and may include one or more metal oxide precursors and/or metal hydroxide precursors. (2) The first group II cation precursor may include one or more metal halide precursors, and may include one or more metal oxide precursors and/or metal hydroxide precursors. (3) The group III cation precursor may include one or more metal halide precursors (the group III cation precursor may also include one or more metal oxide precursors and/or metal hydroxide precursors), and at the same time, the first group II cation precursor may include one or more metal oxide precursors and/or metal hydroxide precursors (the first group II cation precursor may also include one or more metal halide precursors). (4) The group III cation precursor may include one or more metal oxide precursors and/or metal hydroxide precursors (the group III cation precursor may also include one or more metal halide precursors), and at the same time, the first group II cation precursor may include one or more metal halide precursors (the first group II cation precursor may also include one or more metal oxide precursors and/or metal hydroxide precursors). As long as the cation precursor composed of the group III cation precursor and the first group II cation precursor simultaneously contains halide ions, and $O^{2-}$ and/or $OH^-$, various situations may be understood.

In the step SA051, halide ions and hydroxyl ions may be simultaneously bound with the group III cations on the surface of the group III-V quantum dot core, which may be equivalent to fully or non-fully covering a layer of mixed material layer composed of group III metal halide and group III metal hydroxide on the surface of the quantum dot core. The group III metal hydroxide may include at least one of indium hydroxide, gallium hydroxide, and aluminum hydroxide. The group III metal halide may be selected from at least one of indium chloride, indium bromide, indium iodide, gallium chloride, gallium bromide, gallium iodide, aluminum chloride, aluminum bromide, and aluminum iodide.

In the step SB051, after adding the first group II cation precursor, the group II cations may be bound with the group V anions (e.g., P) on the surface of the group III-V quantum dot core, thereby forming spare group III cations. Small molecule halide ion and hydroxyl ion ligands both may be bound with the group III cations on the core surface, and at the same time, the halide ions and hydroxyl ions may also be bound with the group II cations bound to the surface of the group III-V quantum dot core. In other words, the halide ions and the hydroxyl ions may be simultaneously bound with the group III cations and group II cations on the surface of the group III-V quantum dot core, which may be equivalent to fully or non-fully covering a layer of mixed material layer composed of group II metal halide, group III metal halide, group II metal hydroxide and group III metal hydroxide on the surface of the quantum dot core.

After the nucleation reaction in step SA052 or SB052 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution.

In other words, a layer of group II-VI semiconductor outer-shell may be coated on the surface of the group III-V quantum dot core, and the outer-shell may cover the group III-V quantum dot core, and the halide ions and hydroxyl ions bound to the surface of the group III-V quantum dot core. The halide ions and hydroxyl ions may be located between the group III-V quantum dot core and the group II-VI semiconductor outer-shell.

Alternatively, a layer of group II-VI semiconductor outer-shell may be coated on the surface of the group III-V quantum dot core, and the outer-shell may cover the group III-V quantum dot core, and group II cations, halide ions and hydroxyl ions bound to the surface of the group III-V quantum dot core. The halide ions and hydroxyl ions may be located between the group III-V quantum dot core and the group II-VI semiconductor outer-shell.

In this way, the halide ions may passivate the surface of the group III-V quantum dot core, and may effectively suppress the occurrence of non-radiative transition. The hydroxyl ions may enable the lattices of the group III-V quantum dot core and the group II-VI semiconductor outer-shell to be matched. The group II-VI semiconductor outer-shell may substantially effectively separate the carriers confined in the core and the surface states acting as the non-radiative recombination transition centers. In this way, the core-shell quantum dot structure, formed by cooperative action of the halide ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. In one embodiment, a thickness of the group II-VI semiconductor outer-shell may be 3-5 nm.

The embodiments of the above fabrication method of the quantum dot may be shown in Exemplary Embodiments 5-1 to 5-6.

One embodiment of the present disclosure provides a quantum dot including a group III-V quantum dot core, and acetylacetonate ions and hydroxyl ions bound to the surface of the group III-V quantum dot core, where the acetylacetonate ions and hydroxyl ions may be bound with group III cations on the surface of the group III-V quantum dot core.

Another embodiment of the present disclosure provides a quantum dot including a group III-V quantum dot core, group II cations bound with group V anions on the surface of the group III-V quantum dot core, and acetylacetonate ions and hydroxyl ions bound with group III cations and the group II cations on the surface of the group III-V quantum dot core.

In the quantum dot in the disclosed embodiments, the acetylacetonate ion may have a substantially small radial dimension and bidentate coordination sites, which may exchange with the introduced carboxylic acid ligand. In this way, the original ligands on the surface of the group III-V quantum dot core may be reduced, and the separation of nucleation and growth may be achieved. The binding between the hydroxyl ions and the metal cations on the surface of the group III-V quantum dot core may not only passivate the surface of the group III-V quantum dot, and at the same time, but also act as a layer of buffer outer-shell. The lattice mismatch issue between the group III-V quantum dot core and the group II-VI semiconductor outer-shell may be effectively reduced, which may facilitate the growth of thick outer-shell. Therefore, the acetylacetonate ions and hydroxyl ions may be bound with cations on the surface of the group III-V quantum dot core, which may be equivalent to fully or non-fully covering a layer of mixed material layer composed of acetylacetonate metal compound and metal hydroxide on the surface of the quantum dot core. In one embodiment, the acetylacetonate ions and hydroxyl ions may be bound with group III cations on the surface of the group III-V quantum dot core to form group III metal acetylacetonate compound and group III metal hydroxide. In another embodiment, the acetylacetonate ions and hydroxyl ions may be bound with group III cations and group II cations on the surface of the group III-V quantum dot core to form group III metal acetylacetonate compound, group II metal acetylacetonate compound, group II metal hydroxide and group III metal hydroxide. The mixed material may not only improve the size dispersion of the quantum dots, thereby significantly narrowing the peak width, but also facilitate the growth of the thick outer-shell, thereby greatly improving the stability of the quantum dot.

In one embodiment, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb and InPGa. The group III cations may be selected from at least one type of indium ions, gallium ions, and aluminum ions. The group II cations may be selected from at least one type of zinc ions, cadmium ions, mercury ions and magnesium ions. The acetylacetonate ions may be selected from at least one type of hexahydroacetylacetonate ions and hexafluoroacetylacetonate ions.

The group III metal acetylacetonate compound may include at least one of indium hexahydroacetylacetonate, gallium hexahydroacetylacetonate, aluminum hexahydroacetylacetonate, indium hexafluoroacetylacetonate, gallium hexafluoroacetylacetonate and aluminum hexafluoroacetylacetonate. The group II metal acetylacetonate compound may include at least one of zinc hexahydroacetylacetonate, cadmium hexahydroacetylacetonate, magnesium hexahydroacetylacetonate, mercury hexahydroacetylacetonate, zinc hexafluoroacetylacetonate, cadmium hexafluoroacetylacetonate, magnesium hexafluoroacetylacetonate and mercury hexafluoroacetylacetonate. The group III metal hydroxide formed by hydroxyl ions may include at least one of indium hydroxide, gallium hydroxide and aluminum hydroxide. The group II metal hydroxide formed by hydroxyl ions may include at least one of zinc hydroxide, cadmium hydroxide, magnesium hydroxide and mercury hydroxide.

In one embodiment, the surface of the group III-V quantum dot core may be coated with a layer of group II-VI semiconductor outer-shell, and the outer-shell may cover the group III-V quantum dot core, and acetylacetonate ions and hydroxyl ions bound to the surface of the group III-V quantum dot core. The acetylacetonate ions and the hydroxyl ions may be located between the group III-V quantum dot core and the group II-VI semiconductor outer-shell.

In another embodiment, the surface of the group III-V quantum dot core may be coated with a layer of group II-VI semiconductor outer-shell, and the outer-shell may cover the group III-V quantum dot core, and the group II cations, acetylacetonate ions and hydroxyl ions bound to the surface of the group III-V quantum dot core. The acetylacetonate ions and the hydroxyl ions may be located between the group III-V quantum dot core and the group II-VI semiconductor outer-shell. The core-shell quantum dot structure, formed by cooperative action of the acetylacetonate ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. In one embodiment, a thickness of the group II-VI semiconductor outer-shell may be 3-5 nm.

In one embodiment of the present disclosure, a fabrication method of the above quantum dot may include following steps.

SA061: Providing a group III cation precursor and ligand, where the group III cation precursor may include one or more acetylacetonate metal salt precursors, one or more metal oxide precursors and/or one or more metal hydroxide precursors; dissolving the group III cation precursor and ligand in a solvent; and performing a heating treatment under a first temperature condition to obtain a mixed solution.

SA062: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB061: Providing a cation precursor and ligand, where the cation precursor may include a group III cation precursor and a first group II cation precursor, the cation precursor may include one or more acetylacetonate metal salt precursors, one or more metal oxide precursors and/or one or more metal hydroxide precursors; dissolving the cation precursor and ligand in a solvent; and performing a heating treatment under a first temperature condition to obtain a mixed solution.

SB062: Continuously heating the mixed solution to a second temperature, then adding a group V anion precursor to the mixed solution, and performing a nucleation reaction to obtain a group III-V quantum dot core solution.

In the fabrication method of the quantum dot in the disclosed embodiments, before performing the nucleation reaction, in the nucleation process, at least one metal oxide precursor and/or metal hydroxide precursor as well as at least one acetylacetonate metal salt precursor may be first introduced into the reaction system. In this way, in the fabrication process, the cations in the acetylacetonate metal salt precursor may be used for the nucleation reaction. On the other hand, at the moment of nucleation, because the acetylacetonate ion has a substantially small radial dimension and more (2) coordination sites, the acetylacetonate ion may exchange with the carboxylic acid ligand. Therefore, the original ligands on the surface of the group III-V quantum dot core may be reduced, and the separation of nucleation and growth may be achieved. The metal cations in the metal oxide precursor and/or metal hydroxide precursor may also participate in the formation of group III-V quantum dot core. However, the anion in the metal oxide precursor, i.e., $O^{2-}$, may be first bound with proton in the reaction system solution to form $OH^-$, and ultimately $OH^-$ may be quickly bound with cations on the surface of group III-V quantum dot core to effectively passivate the surface of the group III-V quantum dot core, and at the same time, to act as a buffer outer-shell to effectively reduce the lattice mismatch issue between the core and the outer-shell, which may facilitate the growth of thick outer-shell. In the quantum dot ultimately obtained by the fabrication method in the disclosed embodiments, both the acetylacetonate ions and the hydroxyl ions may be bound with the cations on the surface of the group III-V quantum dot core, which may be equivalent to fully and non-fully covering a layer of mixed material layer composed of acetylacetonate metal compound and metal hydroxide on the surface of the group III-V quantum dot core. The mixed material may not only improve the size dispersion of quantum dots, thereby significantly narrowing the peak width (peak width range <45 nm), but also facilitate the growth of thick outer-shell, thereby greatly improving the stability of the quantum dot.

In the step SA061, acetylacetonate ions and hydroxyl ions may be simultaneously bound with group III cations on the surface of the group III-V quantum dot core. In one embodiment, the acetylacetonate ions and hydroxyl ions may be bound with the group III cations on the surface of the group III-V quantum dot core to form group III metal acetylacetonate compound and group III metal hydroxide, which may be equivalent to fully and non-fully covering a layer of mixed material layer composed of the group III metal acetylacetonate compound and the group III metal hydroxide on the surface of the group III-V quantum dot core In the step SB061, after adding the first group II cation precursor, the group II cations may be bound with the group V anions (e.g., P) on the surface of the group III-V quantum dot core, thereby forming spare group III cations. Small molecule acetylacetonate ion and hydroxyl ion ligands both may be bound with the group III cations on the core surface, and at the same time, the acetylacetonate ions and hydroxyl ions may also be bound with the group II cations bound to the surface of the group III-V quantum dot core. In other words, the acetylacetonate ions and the hydroxyl ions may be simultaneously bound with the group III cations and group II cations on the surface of the group III-V quantum dot core, which may be equivalent to fully or non-fully covering a layer of mixed material layer composed of group III metal acetylacetonate compound, group II metal acetylacetonate compound, group II metal hydroxide and group III metal hydroxide on the surface of the quantum dot core.

In one embodiment, the acetylacetonate ions and hydroxyl ions may be bound with the group III cations on the surface of the group III-V quantum dot core to form group III metal acetylacetonate compound and group III metal hydroxide. In one embodiment, the acetylacetonate ions and hydroxyl ions may be bound with the group III cations and group II cations on the surface of the group III-V quantum dot core to form group III metal acetylacetonate compound, group II metal acetylacetonate compound, group II metal hydroxide and group III metal hydroxide.

In the above step SA061, the group III cation precursor may include one or more acetylacetonate metal salt precursors, and may include one or more metal oxide precursors and/or metal hydroxide precursors, which may be understood as following. (1) The group III cation precursor may simultaneously include one or more acetylacetonate metal salt precursors and one or more metal oxide precursors. (2) The group III cation precursor may simultaneously include one or more acetylacetonate metal salt precursors and one or more metal hydroxide precursors. (3) The group III cation precursor may simultaneously include one or more acetylacetonate metal salt precursors, one or more metal oxide precursors and one or more metal hydroxide precursors. In addition, the group III cation precursor may include any other precursor in addition to the one or more acetylacetonate metal salt precursors, the one or more metal oxide precursors and/or metal hydroxide precursors.

In the above step SB061, the cation precursor (the group III cation precursor and the first group II cation precursor) including one or more acetylacetonate metal salt precursors, and one or more metal oxide precursors and/or one or more metal hydroxide precursors may be understood as following situations. (1) The group III cation precursor may include one or more acetylacetonate metal salt precursors, and may include one or more metal oxide precursors and/or metal hydroxide precursors. (2) The first group II cation precursor may include one or more acetylacetonate metal salt precursors, and may include one or more metal oxide precursors and/or metal hydroxide precursors. (3) The group III cation precursor may include one or more acetylacetonate metal salt precursors (the group III cation precursor may also include one or more metal oxide precursors and/or metal hydroxide precursors), and at the same time, the first group II cation precursor may include one or more metal oxide precursors and/or metal hydroxide precursors (the first group II cation precursor may also include one or more acetylacetonate metal salt precursors). (4) The group III cation precursor may include one or more metal oxide precursors and/or metal hydroxide precursors (the group III cation precursor may also include one or more acetylacetonate metal salt precursors), and at the same time, the first group II cation precursor may include one or more acetylacetonate metal salt precursors (the first group II cation precursor may also include one or more metal oxide precursors and/or metal hydroxide precursors). As long as the mixture composed of the group III cation precursor and the first group II cation precursor simultaneously contains acetylacetonate ions, and $O^{2-}$ and/or $OH^-$, various situations may be understood.

After the nucleation reaction in step SA062 or SB062 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution. In other words, a layer of group II-VI semiconductor outer-shell may be coated on the surface of the group III-V quantum dot core, and the outer-shell may cover the group III-V quantum dot core, and the acetylacetonate ions and hydroxyl ions bound to the surface of the group III-V quantum dot core. The acetylacetonate ions and hydroxyl ions may be located between the group III-V quantum dot core and the group II-VI semiconductor outer-shell. Alternatively, a layer of group II-VI semiconductor outer-shell may be coated on the surface of the group III-V quantum dot core, and the outer-shell may cover the group III-V quantum dot core, and group II cations, acetylacetonate ions and hydroxyl ions bound to the surface of the group III-V quantum dot core. The acetylacetonate ions and hydroxyl ions may be located between the group III-V quantum dot core and the group II-VI semiconductor outer-shell. The core-shell quantum dot structure, formed by cooperative action of the acetylacetonate ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. In one embodiment, a thickness of the group II-VI semiconductor outer-shell may be 3-5 nm.

The embodiments of the above fabrication method of the quantum dot may be shown in Exemplary Embodiments 6-1 to 6-6.

One embodiment of the present disclosure provides a quantum dot including a group III-V quantum dot core, and halide ions, acetylacetonate ions and hydroxyl ions bound to the surface of the group III-V quantum dot core, where the halide ions, acetylacetonate ions and hydroxyl ions may be bound with group III cations on the surface of the group III-V quantum dot core.

Another embodiment of the present disclosure provides a quantum dot including a group III-V quantum dot core, group II cations bound with group V anions on the surface of the group III-V quantum dot core, and halide ions, acetylacetonate ions and hydroxyl ions bound with group III cations and the group II cations on the surface of the group III-V quantum dot core.

In the quantum dot in the disclosed embodiments, the halide ions may be bound with metal cations on the surface of the group III-V quantum dot core to passivate the surface of the group III-V quantum dot core, which may effectively suppress the occurrence of non-radiative transition, thereby avoiding a large number of defect states on the surface of the group III-V quantum dot formed by covalent bonding. The acetylacetonate ion may have a substantially small radial dimension and bidentate coordination sites, which may exchange with the introduced carboxylic acid ligand. In this way, the original ligands on the surface of the group III-V quantum dot core may be reduced, and the separation of nucleation and growth may be achieved. The binding between the hydroxyl ions and the metal cations on the surface of the group III-V quantum dot core may not only passivate the surface of the group III-V quantum dot, and at the same time, but also act as a layer of buffer outer-shell. The lattice mismatch issue between the group III-V quantum dot core and the group II-VI semiconductor outer-shell may be effectively reduced, which may facilitate the growth of thick outer-shell. Therefore, the halide ions, acetylacetonate ions and hydroxyl ions may be bound with cations on the surface of the group III-V quantum dot core, which may be equivalent to fully or non-fully covering a layer of mixed material layer composed of metal halide, acetylacetonate metal compound and metal hydroxide on the surface of the quantum dot core. In one embodiment, the halide ions, acetylacetonate ions and hydroxyl ions may be bound with group III cations on the surface of the group III-V quantum dot core to form group III metal acetylacetonate compound, group III metal halide, and group III metal hydroxide. In another embodiment, the halide ions, acetylacetonate ions and hydroxyl ions may be bound with group III cations and group II cations on the surface of the group III-V quantum dot core to form group III metal acetylacetonate compound, group II metal acetylacetonate compound, group II metal hydroxide, group III metal hydroxide, group II metal halide and group III metal halide. The halide ions, acetylacetonate ions and hydroxyl ions may be bound with cations on the surface of the group III-V quantum dot core to form a mixed material layer, which may not only greatly improve luminous efficiency of the quantum dot (greater than 70%), but also improve the size dispersion of the quantum dots. Therefore, the peak width may be significantly narrowed (peak width range <45 nm), the growth of the thick outer-shell may be facilitated, and the stability of the quantum dot may be greatly improved.

In one embodiment, the material of the group III-V quantum dot core may be selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb and InPGa. The group III cations may be selected from at least one type of indium ions, gallium ions, and aluminum ions. The group II cations may be selected from at least one type of zinc ions, cadmium ions, mercury ions and magnesium ions. The halide ions may be selected from at least one type of chloride ions, bromide ions and iodide ions. The acetylacetonate ions may be selected from at least one type of hexahydroacetylacetonate ions and hexafluoroacetylacetonate ions.

The group III metal acetylacetonate compound may include at least one of indium hexahydroacetylacetone, gallium hexahydroacetylacetone, aluminum hexahydroacetylacetone, indium hexafluoroacetylacetone, gallium hexafluoroacetylacetone and aluminum hexafluoroacetylacetone. The group II metal acetylacetonate compound may include at least one of zinc hexahydroacetylacetone, cadmium hexahydroacetylacetone, magnesium hexahydroacetylacetone, mercury hexahydroacetylacetone, zinc hexafluoroacetylacetone, cadmium hexafluoroacetylacetone, magnesium hexafluoroacetylacetone and mercury hexafluoroacetylacetone. The group III metal halide may include at least one of indium chloride, indium bromide, indium iodide, gallium chloride, gallium bromide, gallium iodide, aluminum chloride, aluminum bromide, and aluminum iodide. The group II metal halide may include at least one of zinc chloride, zinc bromide, zinc iodide, cadmium chloride, cadmium bromide, cadmium iodide, magnesium chloride, magnesium bromide, magnesium iodide, mercury chloride, mercury bromide and mercury iodide.

In one embodiment, the surface of the group III-V quantum dot core may be coated with a layer of group II-VI semiconductor outer-shell, and the outer-shell may cover the group III-V quantum dot core, and halide ions, acetylacetonate ions and hydroxyl ions bound to the surface of the group III-V quantum dot core. The halide ions, acetylacetonate ions and the hydroxyl ions may be located between the group III-V quantum dot core and the group II-VI semiconductor outer-shell.

In another embodiment, the surface of the group III-V quantum dot core may be coated with a layer of group II-VI semiconductor outer-shell, and the outer-shell may cover the group III-V quantum dot core, and the group II cations, halide ions, acetylacetonate ions and hydroxyl ions bound to the surface of the group III-V quantum dot core. The halide ions, acetylacetonate ions and the hydroxyl ions may be located between the group III-V quantum dot core and the group II-VI semiconductor outer-shell. The halide ions may passivate the surface of group III-V quantum dot core, and may effectively suppress the occurrence of non-radiative transition. The acetylacetonate ions may achieve separation of nucleation and growth. The hydroxyl ions may enable the lattices of group III-V quantum dot core and group II-VI semiconductor outer-shell to be matched. The group II-VI semiconductor outer-shell may substantially effectively separate the carriers confined in the core and the surface states acting as the non-radiative recombination transition centers. In this way, the core-shell quantum dot structure, formed by cooperative action of the halide ions, acetylacetonate ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. A thickness of the group II-VI semiconductor outer-shell may be 3-5 nm.

In one embodiment of the present disclosure, a fabrication method of the above quantum dot may include following steps.

SA071: Providing a group III cation precursor and ligand, where the group III cation precursor may include one or more metal halide precursors, one or more acetylacetonate metal salt precursors, as well as one or more metal oxide precursors and/or one or more metal hydroxide precursors; dissolving the group III cation precursor and ligand in a solvent; and performing a heating treatment under a first temperature condition to obtain a mixed solution.

SA072: Continuously heating the mixed solution to a second temperature, then adding a group V anion precursor to the mixed solution, and performing a nucleation reaction to obtain a group III-V quantum dot core solution.

Alternatively, another fabrication method may include following steps.

SB071: Providing a cation precursor and ligand, where the cation precursor may include a group III cation precursor and a first group II cation precursor, the cation precursor may include one or more acetylacetonate metal salt precursors, one or more metal halide precursors, as well as one or more metal oxide precursors and/or one or more metal hydroxide precursors; dissolving the cation precursor and ligand in a solvent; and performing a heating treatment under a first temperature condition to obtain a mixed solution.

SB072: Continuously heating the mixed solution to a second temperature, then adding a group V anion precursor to the mixed solution, and performing a nucleation reaction to obtain a group III-V quantum dot core solution.

In the above fabrication method in the disclosed embodiments of the present disclosure, before performing the nucleation reaction, in the nucleation process, at least one metal oxide precursor and/or metal hydroxide precursor, at least one acetylacetonate metal salt precursor and at least one metal halide precursor may be first introduced into the reaction system. In this way, in the fabrication process, the cations in the acetylacetonate metal salt precursor may be used for the nucleation reaction. On the other hand, at the moment of nucleation, because the acetylacetonate ion has a substantially small radial dimension and more (2) coordination sites, the acetylacetonate ion may exchange with the carboxylic acid ligand. Therefore, the original ligands on the surface of the group III-V quantum dot core may be reduced, and the separation of nucleation and growth may be achieved. The cations in the metal halide precursor may also be used for nucleation reaction. On the other hand, halide ions may react with dangling bonds of group V anions on the surface of nucleated group III-V quantum dot core, and the generated $VX_3$ (V may be N, P, or As, X may be halogen) gas may facilitate occurrence of the reaction. Therefore, the group III and group V atoms on the surface of the group III-V quantum dot core may be recombined to form a group III-V quantum dot core with a substantially stable atomic ratio. At the same time, the halide ions may be bound with the cations on the surface of the group III-V quantum dot core to passivate the surface of the group III-V quantum dot core. The metal cations in the metal oxide precursor and/or metal hydroxide precursor may also participate in the formation of the group III-V quantum dot core, while the anion in the metal oxide precursor, i.e., $O^{2-}$, may be first bound with proton in the reaction system solution to form $OH^-$. In this way, the anion generated by the metal oxide precursor and/or metal hydroxide precursor introduced into the precursor may merely include $OH^-$. Ultimately, $OH^-$ may be quickly bound with cations on the surface of group III-V quantum dot core to effectively passivate the surface of the group III-V quantum dot core, and at the same time, to act as a layer of buffer outer-shell to effectively reduce the lattice mismatch issue between the core and the outer-shell, which may facilitate the growth of thick outer-shell. In the quantum dot ultimately obtained by the fabrication method in the disclosed embodiments, the acetylacetonate ions, halide ions and hydroxyl ions may be simultaneously bound to the surface of the group III-V quantum dot core, which may not only greatly improve luminous efficiency of the quantum dot (greater than 70%), but also improve the size dispersion of the quantum dots. Therefore, the peak width may be significantly narrowed (peak width range <45 nm), the growth of thick outer-shell may be facilitated, and the stability of the quantum dot may be greatly improved.

In the above step SA071, the group III cation precursor may include one or more metal halide precursors, one or more acetylacetonate metal salt precursors, as well as one or more metal oxide precursors and/or one or more metal hydroxide precursors, which may be understood as following. (1) The group III cation precursor may simultaneously include one or more metal halide precursors, one or more acetylacetonate metal salt precursors, and one or more metal oxide precursors. (2) The group III cation precursor may simultaneously include one or more metal halide precursors, one or more acetylacetonate metal salt precursors, and one or more metal hydroxide precursors. (3) The group III cation precursor may simultaneously include one or more metal halide precursors, one or more acetylacetonate metal salt precursors, one or more metal oxide precursors, and one or more metal hydroxide precursors. In addition, the group III cation precursor may include any other precursor in addition to the one or more metal halide precursors, one or more acetylacetonate metal salt precursors, one or more metal oxide precursors and/or metal hydroxide precursors.

In the above step SB071, the cation precursor (the group III cation precursor and the first group II cation precursor) including one or more acetylacetonate metal salt precursors, one or more metal halide precursors, as well as one or more metal oxide precursors and/or one or more metal hydroxide precursors may be understood as following situations. (1) The group III cation precursor may include one or more metal halide precursors and one or more acetylacetonate metal salt precursors, and may include one or more metal oxide precursors and/or metal hydroxide precursors. (2) The first group II cation precursor may include one or more metal halide precursors and one or more acetylacetonate metal salt precursors, and may include one or more metal oxide precursors and/or metal hydroxide precursors. (3) The group III cation precursor may include one or more acetylacetonate metal salt precursors (the group III cation precursor may also include one or more metal oxide precursors and/or metal hydroxide precursors, and one or more metal halide precursors), and at the same time, the first group II cation precursor may include one or more metal halide precursors as well as one or more metal oxide precursors and/or metal hydroxide precursors (the first group II cation precursor may also include one or more acetylacetonate metal salt precursors). (4) The group III cation precursor may include one or more metal oxide precursors and/or metal hydroxide precursors (the group III cation precursor may also include one or more acetylacetonate metal salt precursors, and one or more metal halide precursors), and at the same time, the first group II cation precursor may include one or more metal halide precursors and one or more acetylacetonate metal salt precursors (the first group II cation precursor may also include one or more metal oxide precursors and/or metal hydroxide precursors). (5) The group III cation precursor may include one or more metal halide precursors (the group III cation precursor may also include one or more metal oxide precursors and/or metal hydroxide precursors, and one or more acetylacetonate metal salt precursors), and at the same time, the first group II cation precursor may include one or more metal oxide precursors and/or metal hydroxide precursors, and one or more acetylacetonate metal salt precursors (the first group II cation precursor may also include one or more metal halide precursors). As long as the cation precursor mixture composed of the group III cation precursor and the first group II cation precursor simultaneously contains halide ions, acetylacetonate ions, and $O^{2-}$ and/or $OH^-$, various situations may be understood.

In the step SA071, acetylacetonate ions, halide ions and hydroxyl ions may be simultaneously bound with group III cations on the surface of the group III-V quantum dot core, which may be equivalent to fully and non-fully covering a layer of mixed material layer composed of group III metal halide, group III metal hydroxide and group III metal acetylacetonate compound on the surface of the quantum dot core. The group III metal hydroxide may include at least one of indium hydroxide, gallium hydroxide, and aluminum hydroxide. The group III metal acetylacetonate compound may include at least one of indium hexahydroacetylacetone, gallium hexahydroacetylacetone, aluminum hexahydroacetylacetone, indium hexafluoroacetylacetone, gallium hexafluoroacetylacetone and aluminum hexafluoroacetylacetone. The group III metal halide may include at least one of indium chloride, indium bromide, indium iodide, gallium chloride, gallium bromide, gallium iodide, aluminum chloride, aluminum bromide, and aluminum iodide.

In the step SB071, after adding the first group II cation precursor, the group II cations may be bound with the group V anions (e.g., P) on the surface of the group III-V quantum dot core, thereby forming spare group III cations. Halide ion, acetylacetonate ion and hydroxyl ion ligands all may be bound with the group III cations on the core surface, and at the same time, the acetylacetonate ions, halide ions and hydroxyl ions may also be bound with the group II cations bound to the surface of the group III-V quantum dot core. In other words, the acetylacetonate ions, halide ions and hydroxyl ions may be simultaneously bound with the group III cations and group II cations on the surface of the group III-V quantum dot core, which may be equivalent to fully or non-fully covering a layer of mixed material layer composed of group II metal halide, group III metal halide, group III metal acetylacetonate compound, group II metal acetylacetonate compound, group II metal hydroxide and group III metal hydroxide on the surface of the quantum dot core. The group III metal acetylacetonate compound may include at least one of indium hexahydroacetylacetone, gallium hexahydroacetylacetone, aluminum hexahydroacetylacetone, indium hexafluoroacetylacetone, gallium hexafluoroacetylacetone and aluminum hexafluoroacetylacetone. The group II metal acetylacetonate compound may include at least one of zinc hexahydroacetylacetone, cadmium hexahydroacetylacetone, magnesium hexahydroacetylacetone, mercury hexahydroacetylacetone, zinc hexafluoroacetylacetone, cadmium hexafluoroacetylacetone, magnesium hexafluoroacetylacetone and mercury hexafluoroacetylacetone. The group III metal halide may include at least one of indium chloride, indium bromide, indium iodide, gallium chloride, gallium bromide, gallium iodide, aluminum chloride, aluminum bromide, and aluminum iodide. The group II metal halide may include at least one of zinc chloride, zinc bromide, zinc iodide, cadmium chloride, cadmium bromide, cadmium iodide, magnesium chloride, magnesium bromide, magnesium iodine, mercury chloride, mercury bromide and mercury iodide. The group III metal hydroxide may include at least one of indium hydroxide, gallium hydroxide, and aluminum hydroxide. The group II metal hydroxide may include at least one of zinc hydroxide, cadmium hydroxide, magnesium hydroxide, and mercury hydroxide.

After the nucleation reaction in step SA072 or SB072 is done, the second group II cation precursor and the group VI anion precursor may be added to the group III-V quantum dot core solution immediately. The outer-shell growth may be performed under the third temperature condition, and the group II-VI semiconductor outer-shell may be formed on the surface of the group III-V quantum dot core to obtain the core-shell quantum dot solution. In one embodiment, a layer of group II-VI semiconductor outer-shell may be coated on the surface of the group III-V quantum dot core, and the outer-shell may cover the group III-V quantum dot core, and the halide ions, acetylacetonate ions and hydroxyl ions bound to the surface of the group III-V quantum dot core. The halide ions, acetylacetonate ions and hydroxyl ions may be located between the group III-V quantum dot core and the group II-VI semiconductor outer-shell.

In another embodiment, a layer of group II-VI semiconductor outer-shell may be coated on the surface of the group III-V quantum dot core, and the outer-shell may cover the group III-V quantum dot core, and group II cations, halide ions, acetylacetonate ions and hydroxyl ions bound to the surface of the group III-V quantum dot core. The halide ions, acetylacetonate ions and hydroxyl ions may be located between the group III-V quantum dot core and the group II-VI semiconductor outer-shell. The halide ions may passivate the surface of the group III-V quantum dot core, and may effectively suppress the occurrence of non-radiative transition. The acetylacetonate ions may achieve separation of nucleation and growth. The hydroxyl ions may enable the lattices of the group III-V quantum dot core and the group II-VI semiconductor outer-shell to be matched. The group II-VI semiconductor outer-shell may substantially effectively separate the carriers confined in the core and the surface states acting as the non-radiative recombination transition centers. In this way, the core-shell quantum dot structure, formed by cooperative action of the halide ions, acetylacetonate ions, hydroxyl ions and group II-VI semiconductor outer-shell, may have a substantially high luminous efficiency. The material of the group II-VI semiconductor outer-shell may be selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe and MgZnS. A thickness of the group II-VI semiconductor outer-shell may be 3-5 nm.

The embodiments of the above fabrication method of the quantum dot may be shown in Exemplary Embodiments 7-1 to 7-6.

The present disclosure has been tested multiple times in succession, and now a part of the test results may be used as a reference to further describe the present disclosure in detail. A detailed description may be given below in conjunction with specific embodiments.

Embodiment 1-1

(1) Preparation of InP: Zn Quantum Dot Core Solution

At room temperature, 0.2 mmol indium chloride and 1 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of quantum dot outer-shell ZnS coating the quantum dot core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 1-2

(1) Preparation of InP: Zn Quantum Dot Core Solution

At room temperature, 0.2 mmol indium chloride and 1 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of quantum dot outer-shell ZnSe/ZnS coating the quantum dot core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 1-3

(1) Preparation of InP: Zn Quantum Dot Core Solution

At room temperature, 0.2 mmol indium chloride and 1 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 1-4

(1) Preparation of InP/GaP: Zn Quantum Dot Core Solution

At room temperature, 0.2 mmol indium chloride, 0.17 mmol gallium chloride, and 1.5 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 1-5

(1) Preparation of InP/GaP: Zn Quantum Dot Core Solution

At room temperature, 0.2 mmol indium chloride, 0.17 mmol gallium chloride, and 1.5 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 1-6

(1) Preparation of InP/GaP: Zn Quantum Dot Core Solution

At room temperature, 0.2 mmol indium chloride, 0.17 mmol gallium chloride, and 1.5 mmol zinc acetate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 2-1

(1) Preparation of InP: Zn Quantum Dot Core Solution

At room temperature, 0.2 mmol indium acetylacetonate and 1 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 2-2

(1) Preparation of InP: Zn Quantum Dot Core Solution

At room temperature, 0.2 mmol indium acetylacetonate and 1 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 2-3

(1) Preparation of InP: Zn Quantum Dot Core Solution

At room temperature, 0.2 mmol indium acetylacetonate and 1 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 2-4

(1) Preparation of InP/GaP: Zn Quantum Dot Core Solution

At room temperature, 0.2 mmol indium acetylacetonate, 0.17 mmol gallium acetylacetonate, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 2-5

(1) Preparation of InP/GaP: Zn Quantum Dot Core Solution

At room temperature, 0.2 mmol indium acetylacetonate, 0.17 mmol gallium acetylacetonate, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 2-6

(1) Preparation of InP/GaP: Zn Quantum Dot Core Solution

At room temperature, 0.2 mmol indium acetylacetonate, 0.17 mmol gallium acetylacetonate, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 3-1

(1) Preparation of InP: Zn Quantum Dot Core Solution

At room temperature, 0.2 mmol indium acetylacetonate and 1 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 3-2

(1) Preparation of InP: Zn Quantum Dot Core Solution

At room temperature, 0.2 mmol indium acetylacetonate and 1 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 3-3

(1) Preparation of InP: Zn Quantum Dot Core Solution

At room temperature, 0.2 mmol indium acetylacetonate and 1 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 3-4

(1) Preparation of InP/GaP: Zn Quantum Dot Core Solution

At room temperature, 0.2 mmol indium acetylacetonate, 0.17 mmol gallium chloride, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core Inp/Gap: Zn At 300° C., 0.5 ml octanethiol and 3 mmol zinc oleate may be added to the InP/GaP: Zn quantum dot core solution.

Reaction may be maintained for 30 minutes to obtain InP/GaP/ZnS core-shell quantum dots.

Embodiment 3-5

(1) Preparation of InP/GaP: Zn Quantum Dot Core Solution

At room temperature, 0.2 mmol indium acetylacetonate, 0.17 mmol gallium chloride, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 3-6

(1) Preparation of InP/GaP: Zn Quantum Dot Core Solution

At room temperature, 0.2 mmol indium acetylacetonate, 0.17 mmol gallium chloride, and 1.5 mmol zinc acetylacetonate may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core Inp/Gap: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 4-1

(1) Preparation of InP: Zn Quantum Dot Core Solution

At room temperature, 0.2 mmol indium oxide and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 4-2

(1) Preparation of InP: Zn Quantum Dot Core Solution

At room temperature, 0.2 mmol indium oxide and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 4-3

(1) Preparation of InP: Zn Quantum Dot Core Solution

At room temperature, 0.2 mmol indium oxide and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 4-4

(1) Preparation of InP/GaP: Zn Quantum Dot Core Solution

At room temperature, 0.2 mmol indium oxide, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 4-5

(1) Preparation of InP/GaP: Zn Quantum Dot Core Solution

At room temperature, 0.2 mmol indium oxide, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 4-6

(1) Preparation of InP/GaP: Zn Quantum Dot Core Solution

At room temperature, 0.2 mmol indium oxide, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 5-1

(1) Preparation of InP: Zn Quantum Dot Core Solution

At room temperature, 0.2 mmol indium chloride and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 5-2

(1) Preparation of InP: Zn Quantum Dot Core Solution

At room temperature, 0.2 mmol indium chloride and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 5-3

(1) Preparation of InP: Zn Quantum Dot Core Solution

At room temperature, 0.2 mmol indium chloride and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 5-4

(1) Preparation of InP/GaP: Zn Quantum Dot Core Solution

At room temperature, 0.2 mmol indium chloride, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 5-5

(1) Preparation of InP/GaP: Zn Quantum Dot Core Solution

At room temperature, 0.2 mmol indium chloride, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 5-6

(1) Preparation of InP/GaP: Zn Quantum Dot Core Solution

At room temperature, 0.2 mmol indium chloride, 0.17 mmol gallium oxide, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 6-1

(1) Preparation of InP: Zn Quantum Dot Core Solution

At room temperature, 0.2 mmol indium acetylacetonate and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 6-2

(1) Preparation of InP: Zn Quantum Dot Core Solution

At room temperature, 0.2 mmol indium acetylacetonate and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 6-3

(1) Preparation of InP: Zn Quantum Dot Core Solution

At room temperature, 0.2 mmol indium acetylacetonate and 1 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 6-4

(1) Preparation of InP/GaP: Zn Quantum Dot Core Solution

At room temperature, 0.2 mmol indium acetylacetonate, 0.17 mmol gallium acetylacetonate, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 6-5

(1) Preparation of InP/GaP: Zn Quantum Dot Core Solution

At room temperature, 0.2 mmol indium acetylacetonate, 0.17 mmol gallium acetylacetonate, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 6-6

(1) Preparation of InP/GaP: Zn Quantum Dot Core Solution

At room temperature, 0.2 mmol indium acetylacetonate, 0.17 mmol gallium acetylacetonate, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

Embodiment 7-1

(1) Preparation of InP: Zn Quantum Dot Core Solution

At room temperature, 0.2 mmol indium acetylacetonate, 0.5 mmol zinc oxide and 0.5 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnS Coating the Quantum Dot Core InP: Zn At 300° C., 0.3 ml octanethiol and 2 mmol zinc oleate may be added to the InP: Zn quantum dot core solution. Reaction may be maintained for 60 minutes to obtain InP/ZnS core-shell quantum dots.

Embodiment 7-2

(1) Preparation of InP: Zn Quantum Dot Core Solution

At room temperature, 0.2 mmol indium acetylacetonate, 0.5 mmol zinc oxide and 0.5 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSe/ZnS Coating the Quantum Dot Core InP: Zn At 300° C., 0.2 mmol tributylphosphine selenide may be added to the InP: Zn quantum dot core solution. After 20 minutes reaction, 0.2 ml octanethiol and 2 mmol zinc oleate may be added. Reaction may be maintained for 40 minutes to obtain InP/ZnSe/ZnS core-shell quantum dots.

Embodiment 7-3

(1) Preparation of InP: Zn Quantum Dot Core Solution

At room temperature, 0.2 mmol indium acetylacetonate, 0.5 mmol zinc oxide and 0.5 mmol zinc chloride may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.15 mmol tris(trimethylsilyl)phosphine may be added. Reaction may be maintained for 2 minutes to obtain InP: Zn quantum dot core solution.

(2) Synthesis of Quantum Dot Outer-Shell ZnSeS Coating the Quantum Dot Core InP: Zn At 300° C., 0.2 mmol tributylphosphine selenide, 0.2 ml octanethiol and 2 mmol zinc oleate may be added to the InP: Zn quantum dot core solution. Reaction may be maintained for 60 minutes to obtain InP/ZnSeS core-shell quantum dots.

Embodiment 7-4

(1) Preparation of InP/GaP: Zn Quantum Dot Core Solution

At room temperature, 0.2 mmol indium acetylacetonate, 0.17 mmol gallium chloride, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnS Coating the Quantum Dot Core InP/GaP: Zn At 300° C., 0.5 ml octanethiol and 3 mmol zinc oleate may be added to the InP/GaP: Zn quantum dot core solution. Reaction may be maintained for 30 minutes to obtain InP/GaP/ZnS core-shell quantum dots.

Embodiment 7-5

(1) Preparation of InP/GaP: Zn Quantum Dot Core Solution

At room temperature, 0.2 mmol indium acetylacetonate, 0.17 mmol gallium chloride, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSe/ZnS Coating the Quantum Dot Core InP/GaP: Zn At 300° C., 0.2 mmol tributylphosphine selenide may be added to the InP/GaP: Zn quantum dot core solution. After 20 minutes reaction, 0.2 ml octanethiol and 2 mmol zinc oleate may be added. Reaction may be maintained for 40 minutes to obtain InP/GaP/ZnSe/ZnS core-shell quantum dots.

Embodiment 7-6

(1) Preparation of InP/GaP: Zn Quantum Dot Core Solution

At room temperature, 0.2 mmol indium acetylacetonate, 0.17 mmol gallium chloride, and 1.5 mmol zinc oxide may be added to a 50 ml three-necked flask, and then 1 ml oleic acid and 10 ml octadecene may be added. Under vacuum protection, vacuum may be evacuated at 80° C. for 60 minutes, and then under nitrogen atmosphere protection, Nitrogen gas may be exhausted at 140° C. for 60 minutes. After heating the solution to 280° C., 0.3 mmol tris(trimethylsilyl)phosphine may be added. Reaction may be maintained for 2 minutes to obtain InP/GaP: Zn quantum dot core solution.

(2) Synthesis of Quantum Dot Outer-Shell ZnSeS Coating the Quantum Dot Core InP/GaP: Zn At 300° C., 0.2 mmol tributylphosphine selenide, 0.2 ml octanethiol and 2 mmol zinc oleate may be added to the InP/GaP: Zn quantum dot core solution. Reaction may be maintained for 60 minutes to obtain InP/GaP/ZnSeS core-shell quantum dots.

The above descriptions are merely optional embodiments of the present disclosure, and are not intended to limit the present disclosure. For those skilled in the art, the present disclosure may have various modifications and changes. Any modifications, equivalents, improvements, etc., which are within the spirit and scope of the present disclosure, should be included in the protection of the present disclosure.

What is claimed is:

1. A quantum dot, comprising:
a group III-V quantum dot core;
at least one type of halide ions, acetylacetonate ions, or hydroxyl ions bound to a surface of the group III-V quantum dot core, wherein the halide ions, the acetylacetonate ions, and the hydroxyl ions are bound with group III cations on the surface of the group III-V quantum dot core; and
an outer-shell, wherein the outer-shell is made of a group II-VI semiconductor material and coats the group III-V quantum dot core, and the halide ions, the acetylacetonate ions, and the hydroxyl ions bound to the surface of the group III-V quantum dot core.

2. The quantum dot according to claim 1, wherein:
bound to the surface of the group III-V quantum dot core are the halide ions; or
bound to the surface of the group III-V quantum dot core are the hydroxyl ions; or
bound to the surface of the group III-V quantum dot core are the acetylacetonate ions; or
bound to the surface of the group III-V quantum dot core are the halide ions and the hydroxyl ions; or
bound to the surface of the group III-V quantum dot core are the acetylacetonate ions and the hydroxyl ions; or
bound to the surface of the group III-V quantum dot core are the halide ions and the acetylacetonate ions; or
bound to the surface of the group III-V quantum dot core are the halide ions, the acetylacetonate ions and the hydroxyl ions.

3. The quantum dot according to claim 1, wherein a material of the group III-V quantum dot core is selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb, or InPGa.

4. The quantum dot according to claim 1, wherein the group III cations are selected from at least one type of indium ions, gallium ions, or aluminum ions.

5. The quantum dot according to claim 4, wherein the group III cations are the indium ions.

6. The quantum dot according to claim 1, wherein the halide ions are selected from at least one type of chloride ions, bromide ions, or iodide ions.

7. The quantum dot according to claim 1, wherein the acetylacetonate ions are selected from at least one type of hexahydroacetylacetonate ions, or hexafluoroacetylacetonate ions.

8. The quantum dot according to claim 1, wherein the group II-VI semiconductor material is selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe, or MgZnS.

9. The quantum dot according to claim 1, wherein a thickness of the outer-shell is 3-5 nm.

10. A quantum dot, comprising a group III-V quantum dot core, group II cations bound with group V anions on a surface of the group III-V quantum dot core, and at least one type of halide ions, acetylacetonate ions, or hydroxyl ions bound with group III cations and the group II cations on the surface of the group III-V quantum dot core.

11. The quantum dot according to claim 10, wherein:
bound to the surface of the group III-V quantum dot core are the halide ions; or
bound to the surface of the group III-V quantum dot core are the hydroxyl ions; or
bound to the surface of the group III-V quantum dot core are the acetylacetonate ions; or
bound to the surface of the group III-V quantum dot core are the halide ions and the hydroxyl ions; or
bound to the surface of the group III-V quantum dot core are the acetylacetonate ions and the hydroxyl ions; or
bound to the surface of the group III-V quantum dot core are the halide ions and the acetylacetonate ions; or
bound to the surface of the group III-V quantum dot core are the halide ions, the acetylacetonate ions and the hydroxyl ions.

12. The quantum dot according to claim 10, wherein a material of the group III-V quantum dot core is selected from at least one of GaP, GaN, GaAs, GaSb, AlN, AlP, AlAs, AlSb, InP, InAs, InSb, GaNP, GaNAs, GaNSb, GaPSb, AlNP, AlNAs, AlPAs, AlPSb, InNP, InNAs, InNSb, InPAs, InPSb, or InPGa.

13. The quantum dot according to claim 10, wherein the group III cations are selected from at least one type of indium ions, gallium ions, or aluminum ions.

14. The quantum dot according to claim 13, wherein the group III cations are the indium ions.

15. The quantum dot according to claim 10, wherein the group II cations are selected from at least one type of zinc ions, cadmium ions, mercury ions, or magnesium ions.

16. The quantum dot according to claim 10, wherein the halide ions are selected from at least one type of chloride ions, bromide ions, or iodide ions.

17. The quantum dot according to claim 10, wherein the acetylacetonate ions are selected from at least one type of hexahydroacetylacetonate ions, or hexafluoroacetylacetonate ions.

18. The quantum dot according to claim 10, further including:
- an outer-shell, wherein the outer-shell is made of a group II-VI semiconductor material, and the outer-shell coats the group III-V quantum dot core, the group II cations, and the at least one type of the halide ions, the acetylacetonate ions, or the hydroxyl ions bound to the surface of the group III-V quantum dot core.

19. The quantum dot according to claim 18, wherein the group II-VI semiconductor material is selected from at least one of CdS, CdSe, CdO, CdTe, HgO, HgS, HgTe, HgSe, ZnSe, ZnS, ZnTe, ZnO, MgSe, MgS, MgTe, ZnSeS, ZnSeTe, ZnSTe, MgZnSe, or MgZnS; and/or a thickness of the outer-shell is 3-5 nm.

* * * * *